2,973,357

TOTAL SYNTHESIS OF ALDOSTERONE AND INTERMEDIATES THEREIN

William S. Johnson, Madison, Wis., Joseph C. Collins, North Greenbush, N.Y., Raphael Pappo, Skokie, Ill., and Mordecai B. Rubin, Pittsburgh, Pa., assignors to Wisconsin Alumni Research Foundation, Madison, Wis., a corporation of Wisconsin No Drawing. Filed Nov. 28, 1958, Ser. No. 776,715

34 Claims. (Cl. 260—239.55)

This invention relates to a total synthesis of the naturally occurring adrenal cortical hormone, aldosterone, and to intermediates therein.

The synthesis is outlined in the accompanying flow sheets. The starting material is the furfurylidene ketone I (R=H) which is described in the copending application of W. S. Johnson and W. F. Johns, Serial No. 674,565, filed July 29, 1957. The furfurylidene ketone I (R=H) was alkylated with methacrylonitrile in the presence of sodium methoxide in methanol to introduce a 2-cyanopropyl group at the 13-position, predominantly of the α-configuration. The 2-cyanopropyl group contains an asymmetric carbon atom so that a mixture of two diastereoisomeric diols IIA and IIB (R=H) was produced.

The next sequence of steps was concerned with the degradation of the 6-membered ring D. The mixture of isomeric diols II (R=H) was acetylated with isopropenyl acetate to give a mixture of isomeric diacetates II (R=COCH$_3$), and the latter were subjected to ozonolysis followed by prolonged alkaline hydrolysis and acidification to yield a mixture of lactonic dibasic acids IV (R=H, R'=OH). The ozonolysis-hydrolysis reaction proceeded by way of the intermediate cyano dibasic acid III (R=COCH$_3$) which was not isolated. The lactonic dibasic acids IV (R=H, R'=OH) were acetylated with anhydrous acetic acid saturated with hydrogen chloride, and the resulting 3-acetates IV (R=CH$_3$CO, R'=OH) were converted to the diacid chloride IV (R=CH$_3$CO, R'=Cl) with thionyl chloride or oxalyl chloride and condensed with sodio dibenzylmalonate. The resulting malonate derivative IV (R=CH$_3$CO,

was catalytically debenzylated over palladium-on-carbon catalyst and decarboxylated to give the bis-methyl ketone IV (R=CH$_3$CO, R'=CH$_3$). An alternative method used for conversion of acetylated lactonic dibasic acids IV (R=CH$_3$CO, R'=OH) to the bis-methyl ketones IV (R=CH$_3$CO, R'=CH$_3$) comprised reacting the acid chloride IV (R=CH$_3$CO, R'=Cl) with ketene dimethyl acetal followed by hydrolysis and decarboxylation of the intermediate acetyl ketene acetal (R=CH$_3$CO,

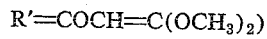

Before proceeding with the degradation of the side chains it was found desirable, although not essential, to separate the mixture of diastereoisomers of the bis-methyl ketones IV (R=CH$_3$CO, R'=CH$_3$) and to carry the two isomers, labelled isomer-A and isomer-B separately through the succeeding steps. Each isomer was subjected to rearrangement with a peracid, e.g. trifluoroperacetic acid in methylene chloride, producing the corresponding triacetates V (R=COCH$_3$). Selective hydrolysis of the triacetates, either under alkaline or acid conditions, designed so that the lactone ring would not be opened, gave the respective triols V (R=H).

There followed next the introduction of the necessary 3-oxo-Δ$^4$-system into ring A. The triol isomers VA and VB were treated separately with N-bromoacetamide in aqueous t-butyl alcohol and then acetylated to give the respective 3-oxo diacetates VI. The latter were then brominated in acetic acid followed by dehydrobromination with lithium chloride in dimethylformamide to produce the unsaturated ketones VII.

Before cyclization of the side chains to form the desired 5-membered ring D, the 3-oxo group was protected as the ketal. Saponification of the ketal diacetates VIII (R=COCH$_3$) with 5% methanolic potassium hydroxide gave the corresponding ketal diols VIII (R=H). The ketal diols VIII (R=H) were then caused to react with p-toluenesulfonyl chloride to form the monotosylate involving the primary alcohol group, and the secondary hydroxy group was oxidized with chromic oxide in pyridine to give the keto tosylate IX. The latter was not purified but was cyclized directly with an alkali metal lower-alkoxide, e.g. potassium tertiary-butoxide in tertiary-butyl alcohol and benzene, to yield a preponderance of the 17α-pregnenone X and a small amount of the 17β-isomer XI. Compound XI proved to be identical with the substance prepared by Schmidlin et al., Helv. Chim. Acta 40, 1034, 2291 (1957), assigned the same formula and prepared by a different synthetic route. The identity was based upon non-depression of mixed melting point and identity of infrared spectra. Compound XI has previously been converted to aldosterone by Schmidlin et al. Hydrolysis of the ketal XI provided the corresponding 4-pregnene-3,20-dione which also proved to be identical with the substance assigned the same structure prepared by Schmidlin et al.

It has also been found possible to carry the mixture of diastereoisomeric methyl ketones IVA and IVB through the foregoing series of reactions to produce the pregnenones X and XI without isolation of the separate isomer at any stage.

The final steps of the synthesis were carried out as follows: the 17α-pregnenone X was reduced with lithium aluminum hydride in tetrahydrofuran to give the lactol ketal XII. Hydrolysis of the ketal XII in acetone in the presence of a trace of water and an acid catalyst gave the corresponding ketone XIII (R=H) which with methanol in the presence of a strong acid, e.g. p-toluenesulfonic acid, was converted to the lactol methyl ether XIII (R=CH$_3$). Oxidation of the latter with dipyridinium chromate in pyridine afforded the diketo lactol ether XIV (R=CH$_3$). Condensation of XIV (R=CH$_3$) with diethyl oxalate in tertiary-butyl alcohol using sodium methoxide as a catalyst gave the insoluble disodium salt of the diglyoxalate adduct XV (R=COCO$_2$C$_2$H$_5$, R'=H) which was then liberated as the free acid with acetic acid and treated, first with iodine to give the 21-iodo-2,21-diglyoxalate XV (R=COCO$_2$C$_2$H$_5$, R'=I), and then with potassium acetate to produce the 2-glyoxalate-21-acetate XVI (R=H, R'=COCO$_2$C$_2$H$_5$). The latter was brominated in the presence of sodium acetate catalyst to give the 2-bromo-2-glyoxalate XVI (R=Br, R'=COCO$_2$C$_2$H$_5$), and sodium methoxide was added to neutralize the acetic acid formed and to facilitate the cleavage of the glyoxalate. Finally, the bromine was removed with zinc in acetic acid, and from the reaction mixture there was isolated the desired 21-acetoxy lactol methyl ether XVII (R=CH$_3$, R'=COCH$_3$). Hydrolysis of the lactol methyl ether XVII (R=CH$_3$, R'=COCH$_3$) using 70% aqueous acetic acid gave dl-17α-aldosterone acetate XVII (R=H, R'=Ac) which was hydrolyzed with methanolic potassium carbonate or bicarbonate to give dl-17α-aldosterone XVII (R, R'=H). The latter hydrolysis also caused some epimerization of the side chain at the 17-position and dl-aldosterone XVIII was separated by chromatography and identified by its infrared spectrum. This basic epimerization can be effected at any stage of the sequence of steps from compound X onward.

Oxidation of dl-aldosterone 21-acetate with chromic oxide in pyridine caused conversion of the lactol to a lactone grouping, thus yielding dl-21-acetoxy-$\Delta^4$-17β-pregnen-11β-ol-3,20-dione - 18 - oic acid (11→18)-lactone (XXVII, R'=COCH$_3$) which was found to be physiologically active, producing a cortical hormone-like activity in mice.

A 21-acetoxy group was introduced into the molecule of the 17α-pregnenone X by a series of reactions analogous to the conversion of XIV to XVII in the lactol ether series. There was thus obtained dl-21acetoxy-$\Delta^4$-17α-pregnen-11β-ol-3,20-dione - 18 - oic acid (11→18)-lactone (XXVIII, R'=COCH$_3$) which could be isomerized to the 17β form (XXVII) by basic hydrolysis and reacetylation. XXVIII (R'=COCH$_3$) can also be prepared by direct oxidation of dl-17α-aldosterone 21-acetate (XVII, R=H, R'=COCH$_3$).

Alternatively, it was found possible to form the 5-membered ring D prior to introduction of the 3-oxo-$\Delta^4$ system. The two isomeric triols V (R=H) were converted to the diketo tosylate XIX by procedures analogous to those for conversion of VIII to IX described above, except that it was preferred to oxidize the 3-hydroxy group to a 3-keto group prior to tosylation in order to prevent esterification of the 3-hydroxy group. The diketo tosylate XIX was then cyclized with potassium tertiary-butoxide to give a 54% yield of the 17α-pregnane-3,20-dione XX and a 26% yield of the 17β-pregnane-3,20-dione XXI. Compounds XX and XXI can be converted to dl-17α-aldosterone and dl-aldosterone, respectively by introduction of the 3-oxo-$\Delta^4$-system and modification of the side chain according to the methods described hereinabove. A preferred route from compound XXI to dl-aldosterone comprises conversion to the dienol acetate XXIV by reaction with isopropenyl acetate, treatment of the dienol acetate with hypobromous acid to yield the 4,21-dibromo compound XXV, reaction of the latter with lithium acetate to give 21-acetoxy-$\Delta^4$-compound XXVI, and finally conversion to dl-aldosterone by diketalization, reduction of the lactone to the lactol with lithium aluminum hydride and hydrolysis of the diketal.

A modified route to the 17β-pregnane-3,20-dione XXI comprised oxidation of the triols V (R=H) with chromic oxide in pyridine to the diketo aldehyde XXII, followed by cyclization with sodium acetate in acetic acid yielded the 16-pregnene-3,20-dione derivative XXIII. Hydrogenation of the latter over palladium-on-strontium carbonate catalyst afforded compound XXI.

The following examples will further illustrate the invention. It is to be understood that in those instances where hydroxy groups are protected in the form of the acetate ester, the invention also contemplates the use of other esters such as the propionate and benzoate. A preferred class of esters comprises those derived from hydrocarbon carboxylic acids having from one to about eight carbon atoms. Similarly, in the case of the lactol ethers XIII–XVIII, inclusive, the invention is not limited to the methyl ethers (R=CH$_3$) but also contemplates other lower-alkyl ethers such as the ethyl, propyl, isopropyl and butyl ethers. Likewise, in the case of the ketal derivatives VIII–XII, inclusive, the invention contemplates cyclic ketals derived from glycols or thioglycols other than ethylene glycol, e.g. propylene glycol, ethane dithiol, propane dithiol, 1-hydroxy-2-mercapto ethane and the like.

All melting points are in degrees centigrade and were determined on a hot stage microscope which was calibrated against a standard set of Anshutz thermometers. All melting points below 220° are corrected.

Ultraviolet spectra were determined in 95% ethanol solution. The following relative intensity abbreviations for the infrared maxima are used: w—weak, m—medium, s—strong, br—broad and v—very.

The chromatographic adsorbent commonly used in this section was Florisil (a magnesia-silica gel catalyst and adsorbent manufactured by the Floridin Co.); the order of elution was benzene, ether, ethyl acetate, and acetone or absolute ethyl alcohol. In certain specified cases only benzene and acetone were used.

*The mixture of 1β-(2-carboxyethyl)-2α-(2-carboxypropyl) - 4β,7α - dihydroxy - 4bβ - methylperhydrophenanthrene-2β-carboxylic acid (2→4)-lactone acetates (IVA, R=CH$_3$CO, R'=OH) and (IVB, R=CH$_3$CO, R'=OH). Directly from the furfurylidene ketone I (R=H)*

A flame dried, nitrogen filled, 100-ml. round-bottomed flask, equipped with a magnetic Teflon-covered stirring bar and a reflux condenser outletted to a dry nitrogen supply, was charged with 15.6 ml. of anhydrous methanol (distilled from calcium hydride) and 0.292 g. (0.0120 mole) of sodium hydride. The mixture was stirred for 5 min. to complete the solution and then there was added 13.0 ml. of tetrahydrofuran freshly distilled from lithium aluminum hydride and 9.9 ml. (0.12 mole) of freshly distilled methacrylonitrile, B.P. 89°. The resulting solution was refluxed for 20 min. in order to prepare the alkylating agent (1-methoxy-2-cyanopropane) and then cooled to room temperature.

Ten grams (0.0260 mole) of the furfurylidene ketone I (R=H), M.P. 195–198°, was added in one portion using 3.0 ml. of tetrahydrofuran as wash. The system was flushed with nitrogen and the slurry was heated to reflux temperature with stirring; the ketone dissolved within 1.5 hrs. The ultraviolet spectrum of small solution samples displayed a shift in the maximum from an initial 225 mμ to 330.0 mμ after 8 hrs. and to 330.1 mμ after 10 hrs. At that time the light brown solution was cooled, acidified with 1.25 ml. of glacial acetic acid, diluted with 300 ml. of ethyl acetate-ether (1:1), and washed with water, with 5% sodium hydroxide solution, with water and finally with saturated brine. The organic solution was dried over anhydrous sodium sulfate and distilled under reduced pressure in a 1-l. round-bottom flask. The residue was dried for 3 hrs. at 100° (1 mm.) to yield 11.6 g. (98% yield) of a crude solid mixture of the two isomeric Michael adducts IIA and IIB (R=H), M.P. 198–208°, λ max 330.2 mμ (log E 4.32).

This crude product was suspended in 600 ml. of freshly distilled isopropenyl acetate, B.P. 95–96°, and then there was added with stirring, a solution of 2.0 g. of p-toluenesulfonic acid monohydrate in 5 ml. of isopropenyl acetate. The suspension was stirred overnight and then allowed to stand for 48 hrs. at room temperature. The resulting cherry red solution was diluted with an equal volume of ether, washed with saturated sodium bicarbonate solution, with water and then with saturated brine. The organic solution was dried and distilled as above in a 2-l. round-bottomed flask.

The gummy, red residue was dissolved in 50 ml. of benzene and the solution was distilled under reduced pressure until the product began separating. Petroleum ether (50 ml.) was then added and the resulting suspension was heated for 15 min. on a steam bath. The remaining solvent was removed under reduced pressure and the resulting pink foam was dried for 1 hr. at 100° (1 mm.). Trituration of the product (13.6 g.) with ether provided 10.8 g. (81.2% yield) of a pink microcrystalline mixture of the diacetates IIA and IIB (R=Ac), M.P. 204–214°, λ$_{max}$ 332.2 mμ (log E 4.37).

A solution of the total crystalline diacetate (10.8 g., 0.0211 mole) in 1.8-l. of ethyl acetate was cooled in a Dry Ice-acetone bath and a stream of ozone in oxygen was passed through the solution until a dark blue color developed indicating the presence of an excess of ozone. The solution was then transferred to a 4-l. Erlenmeyer flask containing 180 ml. of glacial acetic acid, 110 ml. of water and 36 ml. of 30% hydrogen peroxide were added and the mixture was allowed to stand at room temperature, with occasional swirling until homogeneous. After standing for 48 hrs., the solution was cooled to 10° and extracted with two 325 ml. portions of cold 20% sodium hydroxide solution, with two 100 ml. portions of cold 5% sodium hydroxide solution and then with water. The combined aqueous extracts were adjusted to pH 9 with 20% sodium hydroxide solution and then back extracted with ether. The total ethereal solution was washed with 2% ferrous sulfate solution, dried over anhydrous sodium sulfate and distilled under reduced pressure to give 0.697 g. amorphous neutral solid.

The basic aqueous solution above was acidified to pH 2 with concentrated hydrochloric acid and extracted thoroughly with ethyl acetate. These combined extracts were washed with 2% ferrous sulfate solution and then with saturated brine. The organic solution was dried and distilled as above to give a white foam (9.20 g.) which was dissolved in 250 ml. of 10% sodium hydroxide solution in a steel, round-bottomed flask and heated for 20 hr. on a steam bath. The resulting solution was cooled to 5–10°, diluted with 100 ml. of ethyl acetate, and acidified to pH 2 with concentrated hydrochloric acid. The aqueous phase was extracted thoroughly with ethyl acetate and then the combined organic extracts were washed with saturated brine, and dried as above. The solvent was removed under reduced pressure (aspirator) below 30° and the residue was dried at room temperature for 4 hr. (1 mm.) to give 8.2 g. of a tan solid which, on crystallization from 5 ml. of ethyl acetate-methyl ethyl ketone (1:1), and trituration with the same solvent, provided 6.69 g. of almost colorless powder.

The 2.40 g. of amorphous diacetate above was ozonized in 400 ml. of ethyl acetate and processed as described above, using proportionately smaller volumes of reagents and solvents, to give 0.358 g. of neutral tan gum and 1.71 g. of acidic white foam. This acid was hydrolyzed in 46 ml. of 10% sodium hydroxide solution as above to yield 1.41 g. of crude acidic product which crystallized from methyl ethyl ketone-ethyl acetate (1:1) to give 0.41 g. of solid microcrystalline acid. Combination with the above solid acids gave a total of 7.10 g., M.P. 231–263° (dec.); neutralization equivalent 209 (calcd. 211). Thus the overall yield of the crystalline mixture of hydroxy dibasic acids IVA and IVB (R=H, R'=OH) from the furfurylidene ketone I (R=H) was 64.5%.

A suspension of the total solid acid above (7.10 g., 0.0168 mole), in 1.3 l. of anhydrous glacial acetic acid was saturated with anhydrous hydrogen chloride with stirring, using a water bath to maintain the solution temperature between 20 and 25°. The acid dissolved completely after stirring for 2 hrs. and the resulting solution was allowed to stand for 70 hrs. at room temperature. The solution was then distilled under reduced pressure (aspirator) below 50°; the last traces of acetic acid were removed by co-distillation with two 200 ml. portions of benzene. After drying the crude residue to constant weight at room temperature (1 mm.) there was obtained 7.83 g. of a pink microcrystalline mixture of the acetylated dibasic acids IVA and IVB (R=CH$_3$CO, R'=OH), M.P. 131–153° (dec.). This material was used directly for the preparation of the corresponding diketones IVA and IVB (R=CH$_3$CO, R'=CH$_3$) as described below.

*The 1β - (2 - acetylethyl) - 2α - (2 - acetylpropyl) - 4β, 7α - dihydroxy - 4bβ - methylperhydrophenanthrene-2β - carboxylic acid (2→4) - lactone acetates (IVA, R=COCH$_3$, R'=CH$_3$) and (IVB, R=COCH$_3$, R'=CH$_3$)*

(a) VIA THE KETENE ACETAL METHOD

A solution of 2.30 g. (4.96 millimoles) of the mixture of IVA and IVB (R=COCH$_3$, R'=OH), prepared as described above, in 200 ml. of thionyl chloride (freshly distilled from raw linseed oil) was allowed to stand for 3 days at room temperature in a 500 ml. round-bottomed flask equipped with a Teflon-coated magnetic stirring bar. The thionyl chloride was then distilled (below 30°) under reduced pressure (aspirator) through a Claisen head and condensed in a 500-ml. round-bottomed flask in a Dry Ice-acetone bath. When the solution had been concentrated to 10–20 ml., dry purified nitrogen was admitted to the system and the receiver was replaced by another 500-ml. flask. A closed dropping funnel (not pressure equalized) containing 150 ml. of dry benzene was then attached to the Claisen head and the distillation was resumed until a gummy residue was obtained. The system was then closed from the aspirator and a 50 ml. portion of benzene was added, without opening the system to the atmosphere. This portion of benzene was distilled under reduced pressure and the process was repeated twice to insure complete removal of the thionyl chloride. Dry nitrogen was then admitted to the system and the Claisen head was replaced by a reflux condenser outletted to a dry nitrogen supply.

The crude, partly crystalline diacid chloride residue (IV, R=CH$_3$CO, R'=Cl) was cooled in a Dry Ice-acetone bath and 200 ml. of cold (0°), freshly distilled dimethyl ketene acetal, B.P. 89–91°, was added in one portion. The mixture was then heated rapidly with stirring using a preheated (140°) oil bath and maintained at reflux for 2 hours. The solution was then distilled under aspirator pressure, the last traces of the reagent being removed by co-distillation with two 50 ml. portions of benzene.

The resulting orange paste was dissolved in 150 ml. of ether-dioxane (1:1), a solution of 3 ml. of concentrated hydrochloric acid in 100 ml. of water was then added slowly with stirring, and the resulting mixture was stirred overnight at room temperature. The organic and aqueous phases were then separated and the aqueous portion was washed thoroughly with ethyl acetate. The combined organic solutions were extracted with cold 10% potassium bicarbonate solution, with water and then with saturated brine. The organic solution was dried over anhydrous sodium sulfate and evaporated under a stream of nitrogen on a steam bath. The residue was dissolved in 40 ml. of methanol, 80 ml. of 5% sodium hydroxide solution was added, and the solution was left for 39 hrs. at room temperature. The resulting dark brown solution was acidified to pH 2 with concentrated hydrochloric acid, heated for 40 min. on a steam bath, cooled and then extracted with ethyl acetate-ether (1:1). The combined organic extracts were washed with cold 5% sodium hydroxide solution, with water and then with saturated brine. The organic solution was dried as above and distilled in vacuo to give 1.78 g. (85.7% yield) of a crude amorphous mixture of the hydroxy diketones IVA and IVB (R=H, R'=CH$_3$).

The combined basic extracts from both the acid and basic hydrolyses above were acidified to pH 2 with concentrated hydrochloric acid and extracted thoroughly with ethyl acetate-ether (1:1). These combined organic extracts were washed with saturated brine dried as above and distilled to give 2.45 g. of dark red glass.

The crude hydroxy diketone product above was heated for 20 min. on a steam bath in 12 ml. of distilled acetic anhydride and 24 ml. of distilled pyridine. After cooling to room temperature, the solution was diluted with ice and then extracted thoroughly with ethyl acetate-ether (1:1). The combined organic extracts were washed successively with 5% hydrochloric acid (until the washings were pH 2), with water, with 10% potassium bicarbonate solution, and finally with saturated brine. The solution was dried over anhydrous sodium sulfate and distilled under reduced pressure to give 1.90 g. (83.3% yield) of a tan gum which crystallized on trituration with ether to give 1.51 g. of tan crystals, M.P. 141–163°. An additional 0.070 g. of colorless needles, M.P. 136–142°, was eluted with 1:1 benzene-ether on chromatography of the residue on 20 g. of acid-washed alumina in a 1.8 by 7.8 cm. column. The overall yield for the conversion of recrystallized acetoxy dibasic acids IVA and IVB (R=CH$_3$CO, R'=OH) to the crystalline mixture of the acetoxy dimethyl ketones (R'=CH$_3$) was 69.4%.

Repeated recrystallization of the crystalline diketone mixture obtained from another run from ether and finally from isopropyl ether afforded the analytical specimen of diketone-A (IVA, R=CH$_3$CO, R'=CH$_3$) as colorless prisms, M.P. 171.5–173.0°, $\lambda_{max}^{CHCl_3}$ 5.70μ (s) (γ-lactone C=O)

5.84μ (s)(acetate and ketone C=O), and 8.00μ (acetate C—O).

*Analysis.*—Calcd. for C$_{27}$H$_{40}$O$_6$: C, 70.40; H, 8.75. Found: C, 70.37; H, 8.78.

A 1.46 g. sample of the combined solid product from the reaction described directly above was recrystallized from ethyl acetate-petroleum ether (68°) in the presence of seeds of isomer-A. After standing overnight at room temperature, isomer-A had crystallized on the surface of the flask as bulky cluster of prisms and the solution contained several large rosettes of fine needles. The solvent was drawn off and the crystalline forms separated to give 0.892 g. of crude isomer-A, M.P. 160–169°, and 0.167 g. of colorless needles, M.P. 140–144°. Recrystallization of the latter crystals from ether gave 85 mg., M.P. 142.5–144.0°. Five more recrystallizations of a 20 mg. sample of this material from ether and once from isopropyl ether afforded analytical specimen of acetoxy diketone-B (IVB, R=CH$_3$CO, R'=CH$_3$) as fine colorless needles, M.P. 145.0–146.0°. The carbonyl region in the infrared spectrum of isomer-B was the same as given above for isomer-A.

*Analysis.*—Calcd. for C$_{27}$H$_{40}$O$_6$: C, 70.40; H, 8.75. Found: C, 70.09; H, 8.67.

(b) VIA THE MALONIC ESTER METHOD

A 0.232 g. (0.495 millimole) sample of the crude mixture of acetoxy dibasic acids IVA and IVB (R=CH$_3$CO, R'=OH), M.P. 131–140° (dec.), prepared as described above, was dissolved in 10.5 ml. of 0.100 N methanolic sodium hydroxide solution and the methanol was then removed under aspirator pressure at room temperature. The glassy residue was dried for 3 hrs. at 100° (0.8 mm.), 10 ml. of distilled dry benzene (stored over sodium wire) was added with stirring and the resulting suspension was cooled in an ice bath. Then, 4 drops of dry pyridine (distilled from barium oxide) followed by 3 ml. of freshly distilled oxalyl chloride, B.P. 60°, was added with stirring. When the effervescense had essentially ceased (4 min.), the suspension was allowed to warm to room temperature with stirring (7 min.). The excess reagent was removed under aspirator pressure and two 10 ml. portions of dry benzene were added and distilled off under reduced pressure to remove the last traces of pyridine and oxalyl chloride.

The resulting solid product, containing sodium chloride as well as the crude diacid chlorides, was suspended in 12 ml. of dry benzene and a hot solution of sodio dibenzyl malonate in benzene, which was prepared from 1.7 g. (6.00 millimoles) of dibenzyl malonate, B.P. 167–170° and 0.10 g. (8.3 millimoles) of sodium hydride in 12 ml. of benzene was added with stirring. The resulting bright red suspension was refluxed with continued stirring for 2 hrs. and then cooled in an ice bath and acidified with 0.65 ml. of concentrated hydrochloric acid in 17 ml. of ice water. The crude adduct and excess dibenzyl malonate were isolated and hydrogenated in 30 ml. of ethyl acetate—95% ethanol (2:1) over 0.15 g. of 10% palladium-on-carbon catalyst at atmospheric pressure. The reaction virtually stopped after the absorption of 105% of the theoretical amount of hydrogen. The catalyst was separated by filtration and washed with hot ethyl acetate. The filtrate was refluxed for 3 hrs., the solvent was removed under reduced pressure (aspirator), and the residue was dissolved in ethyl acetate, washed with saturated sodium bicarbonate solution, and then dried over sodium sulfate.

The residue obtained on evaporation of the solution was treated with 3 ml. of acetic anhydride and 6 ml. of pyridine for 16 hrs. at room temperature. The resulting solution was processed to give 0.226 g. (99.4% yield) of neutral material which on crystallization from ether-ethyl acetate provided 0.147 g. (64.6% overall yield) of a solid mixture of diketones IV (R=CH$_3$CO, R'=CH$_3$), M.P. 128–143°.

(c) SEPARATION OF THE ISOMERS

In order to obtain more of the separate isomers, the combined solid isomer mixtures described in Part *a* above were fractionally crystallized using the analytical samples as seeds.

The combined solid mixture (2.66 g.) was dissolved in 8 ml. of ethyl acetate on a steam bath and filtered using 2 ml. of hot ethyl acetate to wash. Petroleum-ether (68°) was added until the solution was just cloudy. A few drops of ethyl acetate were then added, a seed of isomer-A was introduced and the solution was allowed to stand at room temperature until small needle rosettes (isomer-B) began to appear above the bulky prism clusters of isomer-A. The solvent was pipetted off and the crystals were recrystallized as above to give 0.581 g. of crude isomer-A (first crop), M.P. 164–171°. The combined mother-liquors were concentrated with petroleum-ether (68°), a seed of isomer-A was added and crystallization was allowed to proceed as above. Recrystallization of the resulting solid as above provided 0.277 g. of prisms (second crop), M.P. 132–153°.

Concentration of the combined mother-liquors and crystallization as above for 3 hrs. at room temperature with a seed of isomer-B gave 0.949 g. of colorless needles, 139.0–141.0°. Recrystallization of these needles from the same solvent pair, without seeding, gave 0.784 g. of diketone-B (IVB, R=CH$_3$CO, R'=CH$_3$) as colorless needles, M.P. 143.0–145.0°. Recrystallization of the combined crops of crude isomer-A from the same solvent without seeding gave 0.753 g. of colorless rhombohedral crystals of diketone-A (IVA, R=CH$_3$CO, R'=CH$_3$), M.P. 171.0–172.0°.

*The 1β-(2-hydroxyethyl)-2α-(2-hydroxypropyl)-4β,7α-dihydroxy - 4bβ - methylperhydrophenanthrene - 2β - carboxylic acid (2→4)-lactone triacetates*

(VA, R=CH$_3$CO) and (VB, R=CH$_3$CO)

(a) ISOMERS-A AND -B FROM THE DIKETONE MIXTURE

A flame-dried, 50 ml. round-bottomed flask equipped with a Teflon-coated magnetic stirring bar and an ice water cooled reflux condenser which was connected to a dry nitrogen supply was charged with 0.232 g. (0.503 millimole) of the solid mixture of diketones IVA and IVB (R=CH$_3$CO, R'=CH$_3$), M.P. 131–162°, prepared as described above, 20 ml. of methylene dichloride (distilled from phosphorous pentoxide), B.P. 37°, and 2.60 g. (18.3 millimole) of powdered disodium hydrogen phosphate dried for 7 hrs. at 100° (100 mm.) just prior to use. The resulting suspension was cooled with stirring to 0–5° (ice bath) and then there was added, in one portion with stirring, a solution of trifluoroperacetic acid in methylene dichloride which was prepared by dissolving 0.16 ml. (6.0 millimoles) of 90% hydrogen peroxide in an ice cooled solution of 1.02 ml. (7.2 millimoles) of freshly distilled trifluoroacetic anhydride, B.P. 37°, in 5 ml. of methylene dichloride. The resulting mixture was stirred for 1.5 hrs. at room temperature and then for 3.5 hrs. at reflux temperature. Ethyl acetate (20 ml.) was then added and the mixture was washed with water and with saturated brine. The organic solution was dried over anhydrous sodium sulfate and distilled under reduced pressure (aspirator).

The colorless viscous residue (0.264 g., some residual solvent present) was chromatographed on 12.5 g. of Florisil in a 1.8 by 10.5 cm. column. The fractions (all 60 ml.) eluted with 4:1 and 1:1 benzene-ether all crystallized completely on scratching in ether and yielded 0.175 g. (70.6% yield) of a white solid, M.P. 119–127°. This material was dissolved in ether and the resulting solution was concentrated to 5 ml. while adding iso-propyl ether to displace the ether. After standing for 11 hrs. at room temperature the solution contained two crystalline forms: needles melting at 137.0–139.0°, and plates melting at 139.8–142.0°; the mixture melted at 118–130°. A few seeds of each form were removed and the remaining crystalline mixture was crystallized as described above with a seed of the plate form to give 50 mg. of colorless plates, M.P. 139.0–141.5°. The mother liquors were concentrated to 3–4 ml., seeded with a sample of the needle form.

After 4 hrs. the solvent was removed to give 87 mg. of needles, M.P. 137.0–140.0°. An additional recrystallization of the 50- and 87-mg. samples from isopropyl ether gave 45 mg., M.P. 140.0–141.5°, and 79 mg., M.P. 137.5–139.0°, respectively. Three more recrystallizations of a 20 mg. sample of the latter material from isopropyl ether provided a specimen of triacetate-A (VA, R=CH$_3$CO), M.P. 140.0–141.0° (see below), as fine colorless needles.

*Analysis.*—Calcd. for C$_{27}$H$_{40}$O$_8$: C, 65.83; H, 8.19. Found: C, 66.18; H, 8.35.

Identical treatment of a 20 mg. sample of the 140.0–141.5°, material above gave triacetate-B (VB, R=CH$_3$CO), M.P. 142.0–142.5°, as colorless plates.

*Analysis.*—Calcd. for C$_{27}$H$_{40}$O$_8$: C, 65.83; H, 8.19. Found: C, 66.10; H, 8.18.

The infrared spectra of both samples (in chloroform) displayed bands at 5.68 $\mu$ (s)($\gamma$-lactone C=O), 5.79 $\mu$ (s)(acetate C=O), 8.00 $\mu$ (br)(acetate C—O), 8.66 $\mu$ (m), 9.79 $\mu$ (m), 10.49 $\mu$ (w) and 10.74 $\mu$ (w). A slight shift of a band at 8.85 $\mu$ (w) in isomer-A to 8.88 $\mu$ (w) in isomer-B represented the only major difference in the spectra.

(b) ISOMER-A (VA, R=CH$_3$CO) FROM DIKETONE-A (IVA, R=CH$_3$CO, R'=CH$_3$)

A solution of 0.461 g. (1.00 millimole) of diketone-A, M.P. 171.0–172.5°, prepared as described above, and 12 millimoles of trifluoroperacetic acid, prepared and added as described in Part *a* above, in 50 ml. of methylene dichloride was stirred with 5.20 g. (36.6 millimoles) of disodium hydrogen phosphate (see above) for 5 min. at 0–5° and then at reflux for 4 hours. After cooling to room temperature, the mixture was diluted with ethyl acetate and washed with water, with 5% sodium bicarbonate solution and then with saturated brine. The solution was dried over anhydrous sodium sulfate and evaporated under a stream of dry air on a steam bath.

The residue crystallized completely on scratching in ether to give 0.483 g. (98.1% recovery) of colorless needles, M.P. 131–136° with softening from 128°. A 0.316 g. sample of this product was chromatographed on 16 g. of Florisil in a 1.8 by 14 cm. column. The fractions eluted with 9:1 benzene-ether to 9:1 ether-ethyl acetate gave 0.280 g. (87.0% yield) of triacetate-A (VA, R=CH$_3$CO) as colorless needles, M.P. 138.0–140.0° undepressed on admixture with the 140.0–141.0° analytical sample isolated from the triacetate mixture as described in Part *a* above.

(c) ISOMER-B (VB, R=CH$_3$CO), FROM DIKETONE-B (IVB, R=CH$_3$CO, R'=CH$_3$)

A 0.231 g. (0.500 millimole) sample of diketone-B, M.P. 143.0–145.0° prepared as described above, was oxidized exactly as described directly above using 0.5 times the quantities of materials. The product (0.248 g.) crystallized from i-propyl ether to give 0.198 g. (80.0% yield) of colorless plates in two crops: 0.182 g. (first crop), M.P. 138.0–141.0° and 0.016 g. (second crop), M.P. 137.0–141.0°. A mixture melting point of the first crop material with the 142.0–142.5° melting analytical sample of VB (R=CH$_3$CO) described in Part *a* above had M.P. 138.0–142.0°.

*The 1β-(2-hydroxyethyl)-2α-(2-hydroxypropyl)-4β,7α-dihydroxy-4bβ-methylperhydrophenanthran-2β-carboxylic acid (2→4)-lactones (VA, R=H) and (VB, R=H)*

(a) ISOMER A (VA, R=H)

(1) *Basic hydrolysis.*—A 46.0 mg. (0.0934 millimole) sample of triacetate-A (VA, R=CH$_3$CO), M.P. 139.0–141.5°, prepared as described above, was dissolved in 1.1 ml. of 1.0 N absolute methanolic potassium hydroxide solution. The resulting solution was allowed to stand for 6 hrs. at room temperature (25°) and then was diluted with 20 ml. of water and extracted thoroughly with ethyl acetate. These combined extracts were washed with saturated brine, dried over anhydrous sodium sulfate and evaporated under a stream of dry nitrogen on a steam bath.

The resulting 34 mg. (99% recovery) of solid foam crystallized from ethyl acetate to give 25.1 mg. (73% yield) of triol-A (VA, R=H) as colorless prisms, M.P. 173.0–174.0°. Four recrystallizations from acetone provided a specimen melting at 174.5–175.5°, $\lambda_{max.}^{Nujol\ mull}$ 3.14$\mu$ (m)(associated hydroxyl O—H)

5.68 $\mu$ (s) ($\gamma$-lactone C=O), 8.68 $\mu$ (m), 9.52 $\mu$ (m) and 10.78 $\mu$ (mw).

*Analysis.*—Calcd. for C$_{21}$H$_{34}$O$_5$: C, 68.82; H, 9.35. Found: C, 68.79; H, 9.47.

(2) *Acidic hydrolysis.*—A solution of 0.247 g. (0.502 millimole) of the triacetate-A, (VA, R=H), M.P. 138.0–140.0°, prepared as described in Part *b* above, and 3.7 ml. of concentrated hydrochloric acid in 75 ml. of distilled absolute methanol was heated at reflux for 1.5 hrs. under nitrogen. The resulting solution was distilled (below 30°) to 20 ml. under aspirator pressure, diluted with 100 ml. of water and extracted thoroughly (5 times) with ethyl acetate. The combined extracts were washed with saturated brine and dried over anhydrous sodium sulfate. Distillation of the solvent under aspirator pressure gave only 85.8% (0.147 g.) recovery of the product and therefore the combined aqueous solution was concentrated to 40 ml. in vacuo and extracted again with ethyl acetate. These combined extracts were processed as above to give the remaining 0.046 g. of product. The entire product was crystallized from ethyl acetate and triturated to yield 0.152 g. of colorless prisms, M.P. 172.0–174.0°. Concentration of the mother liquors provided an additional 0.006 g., M.P. 169.5–172.0°, thus raising the yield to 86.0%.

The residue from the mother liquors was treated with 0.3 ml. of concentrated hydrochloric acid in 6 ml. of methanol at reflux for 1.5 hrs. under nitrogen. The resulting solution was concentrated to 1 ml., diluted with 10 ml. of water and extracted thoroughly with ethyl acetate. These combined extracts were extracted with 5% sodium bicarbonate solution, water, and then saturated brine. The solution was dried over anhydrous sodium sulfate and evaporated. The residue (25 mg.) crystallized from ethyl acetate and, after trituration and one recrystallization from ethyl acetate-petroleum ether (68°), provided 0.011 g. of crystals, M.P. 168–172°. The total conversion of triacetate-A to crystalline triol-A (VA, R=H) was thus 91.9%.

(b) ISOMER-A FROM DIKETONE-A (IVA, R=CH$_3$CO, R'=CH$_3$). WITHOUT INTERMEDIATE PURIFICATION (1) *Basic hydrolysis.*—A 48.3 mg. sample (0.0980 millimole) of crude triacetate-A (VA, R=CH$_3$CO), M.P. 131.0–136.0° with softening from 128°, prepared from acetoxy diketone-A (IVA, R=CH$_3$CO), M.P. 171.0–

172.5°, as described above, was dissolved in 1.2 ml. of 1 N methanolic potassium hydroxide solution and left for 7 hrs. at room temperature. The resulting solution was diluted with 10 ml. of water and extracted 5 times with ethyl acetate. The combined extracts were washed with saturated brine, dried over anhydrous sodium sulfate and then evaporated. The solid residue crystallized from acetone to yield 26 mg. of colorless prisms, M.P. 170.5–174.0°, or 72% overall yield of crystalline triol-A (VA, R=H) from acetoxy diketone-A (IVA, R=CH$_3$CO, R'=CH$_3$).

(2) *Acidic hydrolysis.*—A 0.231 g. (0.501 millimole) sample of the diketone-A (IVA, R=CH$_3$CO, R'=CH$_3$), M.P. 171.0–172.5°, prepared as described above in the diketone separation procedure, was converted into crude triacetate-A (VA, R=CH$_3$CO), 0.245 g., M.P. 133–136°, precisely as described in Part *a* above. The entire product was dissolved in 75 ml. of absolute methanol, 3.7 ml. of concentrated hydrochloric acid was added and the resulting solution was refluxed for 2 hrs. under nitrogen. The resulting solution was concentrated to 10 ml. under reduced pressure, diluted with 50 ml. of water and extracted 4 times with ethyl acetate. The combined organic extracts were washed with saturated brine, dried over anhydrous sodium sulfate and distilled under reduced pressure. The colorless glassy residue (0.168 g., 91.9% recovery) was dissolved in ethyl acetate (1 ml.) seeded with triol-A and allowed to stand for 12 hrs. at room temperature. Since only a small portion of the product crystallized, it was redissolved, this time in 1 ml. of acetone, and petroleum ether was added until the solution was slightly cloudy. After standing for 12 hrs. with a seed of triol-A, the deposited solid was triturated with ethyl acetate to give 0.120 g. (65.3% yield) of colorless crystals (VA, R=H), M.P. 169.0–173.0°.

(c) ISOMER-B (VB, R=H) FROM TRIACETATE-B (VB, R=CH$_3$CO)

(1) *Acidic hydrolysis.*—A solution of 45.7 mg. (0.0928 millimole) of triacetate-B (VB, R=CH$_3$CO), M.P. 138.5–140.0°, prepared as described above, in 15 ml. of absolute methanol and 0.7 ml. of concentrated hydrochloric acid was refluxed for 1.5 hrs. under nitrogen. The resulting solution was concentrated to 4–5 ml. under reduced pressure, diluted with 10 ml. of water and extracted thoroughly with ethyl acetate. The combined extracts were washed with 5% sodium bicarbonate solution, with water and then with saturated brine. The organic solution was dried over anhydrous sodium sulfate and distilled under reduced pressure. The colorless residue (31.0 mg., 84.7% yield) was crystallized from ethyl acetate (1 ml.) to yield 23.1 mg. (68% yield) of colorless irregular blades, M.P. 177.5–180.0°. Admixture with triol-A gave M.P. 162–166°. Repeated recrystallization (7 times) from ethyl acetate and from acetone-petroleum ether (68°) provided VB (R=H) as colorless blades, M.P. 184.0–185.0° with a small residue finally melting at 189°;

$\lambda_{\text{max.}}^{\text{Nujol mull}}$ 2.91$\mu$ (ms)

2.98 $\mu$ (ms), 3.09 $\mu$ (m) (hydroxy O—H), 5.75 $\mu$ (s) ($\gamma$-lactone C=O) and a very weak shoulder at 5.82 $\mu$.

*Analysis.*—Calcd. for C$_{21}$H$_{34}$O$_5$: C, 68.82; H, 9.35. Found: C, 69.19; H, 9.12.

(2) *Basic hydrolysis.*—A solution of 54.0 mg. (0.110 millimole) of triacetate-B (VB, R=CH$_3$CO), M.P. 142.0–143.5°, in 1.3 ml. of 1 N methanolic potassium hydroxide solution was left for 6 hrs. at room temperature. The products were isolated exactly as described in the first run of Part *a* above to give 31 mg. (77% yield) of neutral solid by direct extraction and 7.0 mg. (17% yield) of relactonized material. The former product (31 mg.) was allowed to crystallize from ethyl acetate for 4 hrs. at room temperature and on trituration with ethyl acetate provided 25 mg. (62% yield) of irregular blades, M.P. 173.0–174.0°. Recrystallization of this material from acetone afforded 20 mg., M.P. 183.0–184.0°, with a residue finally melting at 191.0°. Two more recrystallizations from acetone provided a specimen (10 mg.), M.P. 192.0–194.0°, with softening from 186° which exhibited the same infrared spectrum as the analytical specimen of triol-B (VB, R=H).

(d) ISOMER-B. DIRECTLY FROM ACETOXY DIKETONE-B (IVB, R=CH$_3$CO, R'=CH$_3$)

*Acidic hydrolysis.*—A 0.231 mg. (0.502 millimole) sample of the diketone-B (IVB, R=CH$_3$CO, R'=CH$_3$), M.P. 140.5–144.5°, prepared as described above in the isomer separation procedure, was treated as described above to give 0.252 g. of crude triacetate-B (VB, R=CH$_2$CO). This entire product was treated with 3.7 ml. of concentrated hydrochloric acid in 75 ml. of anhydrous methanol for 30 hrs. at room temperature. The resulting solution was processed as described in the first run of Part *c* directly above to give 0.18 g. of crude triol-B (VB, R=H). A 139 mg. sample of this material was crystallized from ethyl acetate to yield 87.0 mg. of colorless crystals, M.P. 171.0–176.0°. One more recrystallization from the same solvent provided 72.0 mg. (53.4% overall yield) of triol-B (VB, R=H), M.P. 180.0–182.5°.

*Acetylation of Triol-A (VA, R=H).*—A solution of 41.0 mg. (0.112 millimoles) of triol-A (VA, R=H), M.P. 172.0–173.5°, in 2 ml. of distilled pyridine and 1 ml. of distilled acetic anhydride, B.P. 136–137°, was left for 18 hrs. at room temperature. Crushed ice was then added until the solution was cloudy and the resulting mixture was diluted with ethyl acetate and extracted successively with 5% hydrochloric acid, with water, with 5% sodium bicarbonate solution, and finally with saturated brine. The resulting organic solution was dried over anhydrous sodium sulfate and distilled under reduced pressure. The residue crystallized on trituration with isopropyl ether to yield 53.8 mg. (97.5% yield) of colorless needles, M.P. 139.5–141.0° undepressed on admixture with the analytical specimen of triacetate-A (VA, R=CH$_3$CO), M.P. 140.0–141.0°.

*Acetylation of Triol-B (VB, R=H).*—An 8.0 mg. (0.022 millimole) sample of triol-B (VB, R=H), M.P. 182.0–184.0°, was acetylated with 0.6 ml. of pyridine and 0.3 ml. of acetic anhydride as described for triol-A above. The colorless glassy product (12.1 mg.) crystallized from isopropyl ether to yield 8.2 mg. (76% yield) of colorless plates, M.P. 140.5–142.0° undepressed on admixture with the analytical specimen of triacetate-B (VB, R=CH$_3$CO), M.P. 141.5–142.0°.

*The 1β-(2-hydroxyethyl) - 2α - (2-hydroxypropyl)-4β-hydroxy - 4bβ - methyl - 7 - oxoperhydrophenanthrene-2β-carboxylic acid (2→4)-lactone diacetates*

(a) ISOMER-A (VIA, R=CH$_3$CO)

To a precooled (10°) solution of 0.452 g. (0.917 millimole) of triacetate-A (VA, R=CH$_3$CO), M.P. 137.5–139.5°, prepared as described above, in 50 ml. of distilled anhydrous methanol was added a solution of 2.00 g. (14.4 millimoles) of anhydrous potassium carbonate in 20 ml. of water. The resulting solution was allowed to stand for 2.25 hrs. at room temperature (26°) and then distilled (20 min. required) to a volume of 20 ml. under reduced pressure (aspirator) in a 50–60° water bath. The resulting solution was cooled in an ice bath, acidified to pH 2 with concentrated hydrochloric acid, diluted with 5 ml. of saturated brine and extracted three times with 30 ml. portions of ethyl acetate. The combined organic extracts were washed with saturated brine and dried over anhydrous sodium sulfate. The solvent was distilled under reduced pressure to give 0.370 g. of a colorless glassy solid.

The above product was allowed to crystallize overnight in 5 ml. of ethyl acetate. The resulting solid was triturated with ethyl acetate to give 0.292 g. (87.5% based on triol) of colorless crystals, M.P. 163.0–167.0°. Recrystallization of this product from ethyl acetate provided 0.254 g. (80.0% yield) of spherical crystals, M.P. 166.0–168.0°, $\lambda_{max.}^{Nujol\ mull}$ 3.20μ (s)(hydroxyl O—H)

5.70 μ (s)(γ-lactone C=O) and a slight shoulder at 5.80 μ but no band at 8.10 μ (acetate C—O). Mixture melting point of this product with triol-A (VA, R=H), M.P. 171.0–172.5°, was 168–172°.

The entire, recombined product was warmed on a steam bath in 11 ml. of distilled acetone and 3.7 mg. of t-butyl alcohol until dissolved. The resulting solution was cooled to 10° and there was added 1.80 ml. of water followed by 0.500 g. (3.63 millimole) of N-bromoacetamide (NBA), M.P. 107.5–108.0°, with stirring. Soon after the NBA had dissolved (about 1 min.), fine colorless needles began separating from the solution. Addition of 1.8 ml. of distilled methylene dichloride caused the crystals to redissolve and the resulting solution was allowed to stand for 4 hrs. at 5–10° (refrigerator). A cold solution of 1.8 g. (0.0143 mole) of sodium sulfide in 20 ml. of water was then added and the resulting mixture was stirred for 5 min. in an ice bath and then extracted with three 50 ml. portions of ethyl acetate. These combined organic extracts were washed with saturated brine and dried over anhydrous sodium sulfate. The solvent was removed under reduced pressure and the residue was dried for 15 min. at 100° (0.9 mm.).

The entire crude product, containing some acetamide, was dissolved in 10 ml. of distilled pyridine and 5 ml. of distilled acetic anhydride and allowed to stand for 14 hrs. at room temperature. Crushed ice was then added with swirling until the solution became cloudy and, after standing for 10 min., the mixture was diluted with 100 ml. of ether-ethyl acetate (1:1) and washed with 5% hydrochloric acid (until pH 2), with saturated bicarbonate and then with water. The aqueous extracts were washed with ethyl acetate and then the combined organic solution was washed with saturated brine, dried as above and reduced to dryness to yield 0.395 g. (96.1% recovery based on keto diacetate) of a colorless glass.

The above product, which could not be induced to crystallize, was chromatographed on 20.0 g. of acid-washed alumina. Initial elution with 99:1 to 9:1 benzene-ether, (100 ml. fractions) gave 4.9 mg. (1.1% recovery) of an amorphous solid. An ether soluble product (12.0 mg., 2.7% recovery) was eluted with 9:1 and 4:1 benzene-ether and crystallized from i-propyl ether to give 7.8 mg. (1.7% recovery) of colorless needles, M.P. 135.0–139.0°, undepressed on admixture with triacetate-A (VA, R=CH$_3$CO). Elution with 1:1 benzene-ether through 1:1 ether-ethyl acetate provided 0.279 g. (70.5% recovery) of ether insoluble material which crystallized on scratching in ethyl acetate-ether. Recrystallization of this material from acetone-i-propyl ether provided 0.224 g. (55.0% yield) of colorless prisms in three crops: 0.148 g. (first crop), M.P. 134.0–136.0°; 0.065 g. (second crop), M.P. 133.0–135.0°; and 0.011 g. (third crop), M.P. 129.0–133.0° with slight softening from 120°. Four recrystallizations of a 20 mg. sample of the first crop material from ethyl acetate-i-propyl ether and then from acetone-i-propyl ether provided the analytical specimen (5 mg.) of keto diacetate-A (VIA, R=CH$_3$CO) as colorless prisms, M.P. 135.0–136.0°, $\lambda_{max.}^{CHCl_3}$ 5.70μ (m)(γ-lactone C=O)

5.83 μ (s)(acetate and ketone C=O), and 8.08 μ (s, br)(acetate C—O).

Analysis.—Calcd. for C$_{25}$H$_{36}$O$_7$: C, 66.94; H, 8.09. Found: C, 66.90; H, 8.05.

The remaining 0.219 g. of keto diacetate-A (VIA, R=CH$_3$CO) was recrystallized from i-propyl ether-acetone to give 0.194 g. of prisms, M.P. 134.0–136.0°, which were used in the bromination reaction given below.

(b) ISOMER-B (VIB, R=CH$_3$CO)

Except for the use of a 1- instead of a 2.25-hr. hydrolysis period, the conversion of triacetate-B (VB, R=CH$_3$CO) to keto diacetate-B (VIB, R=CH$_3$CO) was accomplished using the procedures and reagents described in Part a.

To a cooled solution of 0.478 g. (0.970 millimole) of tricetate-B (VB, R=CH$_3$CO), M.P. 141.0–142.5°, in 40 ml. of anhydrous methanol was added a solution of 2.00 g. (14.4 millimoles) of anhydrous potassium carbonate in 20 ml. of water. The resulting solution was allowed to stand for 1 hr. at room temperature (25°) and then processed as described above to give 0.385 g. of glassy product which could not be induced to crystallize. This entire product was dissolved in 12.0 ml. of acetone, the solution was cooled (ice bath) and there was added 3.9 ml. of t-butyl alcohol, 1.9 ml. of water and then 0.526 g. (3.86 millimoles) of NBA with swirling. The NBA dissolved rapidly and no precipitation occurred. The resulting solution was allowed to stand for 4 hrs. at 5° in the dark and then processed as described in Part a to give 0.406 g. of colorless glass (some acetamide present) which was acetylated precisely as described in Part a.

The resulting colorless glass (0.415 g.) was chromatographed on 21.0 g. of acid-washed alumina in a 1.4 by 15 cm. column. The initial fractions (all 100 ml.) eluted with benzene through 19:1 benzene-ether gave 0.007 g. of acetone insoluble oil. Elution with 9:1 benzene-ether provided 0.041 g. (9.9% recovery) of crude triacetate-B (VB, R=CH$_3$CO) which, on one recrystallization from i-propyl ether, provided 0.028 g. (5.9% yield) of colorless plates, M.P. 141.0–142.5° undepressed on admixture with the starting material. Continued elution with 9:1 benzene-ether gave 0.006 g. (1.5% recovery) of a non-crystalline glass. The fractions eluted with 4:1 benzene-ether through ethyl acetate provided 0.346 g. (83.3% recovery) of an ether-insoluble, crystalline material. A center fraction was recrystallized 4 times from i-propyl ether-acetone to yield the analytical sample (13 mg.) of keto diacetate-B (VIB, R=CH$_3$CO) as colorless blades, M.P. 127.0–128.5°.

Analysis.—Calcd. for C$_{25}$H$_{36}$O$_7$: C, 66.94; H, 8.09. Found: C, 66.92; H, 8.24.

Except for a weak band at 8.90 μ in the infrared spectrum (chloroform) of keto diacetate-B, the spectra of the A and B isomers were essentially identical.

The remaining 0.333 g. of keto diacetate-B (VIB, R=CH$_3$CO) was recrystallized twice from i-propyl ether-acetone to give 0.259 g. of colorless blades, M.P. 124.5–126.0°, and then 0.030 g. of spherical crystals, M.P. 139.0–145.0°. Two recrystallizations of the latter material from i-propyl ether-ethyl acetate, using seeds of the same material, gave 0.023 g. of colorless prisms, M.P. 147.0–148.5°. Admixture of this material with the 127.0–128.5° analytical sample of keto diacetate-B (VIB, R=CH$_3$CO) melted at 147.0–148.5° with softening and resolidification at 127.0–135.0°, while admixture of it with the triacetate-B (VB, R=CH$_3$CO), M.P. 141.0–142.5°, melted at 120.0–128.0°. The infrared spectrum of the 147.0–148.5° and 127.0–128.5° samples were identical, thus proving that they were two polymorphic modifications of keto diacetate-B (VIB, R=CH$_3$CO). The total overall yield of keto diacetate-B (VIB, R=CH$_3$CO) from triacetate-B (VB, R=CH$_3$CO) was 0.302 g. of 77.0% based on recovered starting material.

*The 1β - (2 - hydroxyethyl) - 2α - (2 - hydroxypropyl-4β - hydroxy - 4bβ - methyl - 7 - oxo - 1,2,3,4,4aα, 4bβ,5,6,7,9,10,10aβ - dodecahydrophenanthrene - 2β-carboxylic acid (2→4)-lactone diacetates*

(a) ISOMER-A (VIIA, R=CH$_3$CO)

To a solution of 0.194 g. (0.483 millimole) of keto diacetate-A (VIA, R=CH$_3$CO), M.P. 134.0–136.0°, prepared as described above, in 1.5 ml. of glacial acetic acid (distilled from potassium permanganate) containing 0.05 ml. of a 0.14 N solution of hydrobromic acid, prepared by diluting 0.2 ml. of 48% hydrobromic acid to 10 ml. with glacial acetic acid, was added with stirring, 0.0720 g. (0.451 millimole) of bromine in 1.00 ml. of glacial acetic acid over 10-min. period at room temperature. The resulting light orange solution was stirred for an additional 5 min., 0.20 g. of anhydrous sodium acetate was then added and the resulting mixture was stirred for 2 min., diluted with ethyl acetate and washed with water, with 10% potassium bicarbonate solution, and then with saturated brine. The organic solution was dried over anhydrous sodium sulfate and distilled under reduced pressure. The residue was dried for 15 min. at 100° (0.5 mm.) and then for 10 hrs. (0.5 mm.) at room temperature in a desiccator over anhydrous calcium sulfate.

The entire product (0.238 g., 104% of theory) was dissolved in 2.2 ml. of dimethylformamide (distilled from phosphorous pentoxide), B.P. 158.5–159.0°, and there was added 0.057 g. (1.4 millimole) of anhydrous lithium chloride (dried at 100°/0.5 mm. for 8 hrs.). The resulting solution was warmed to 100° with stirring under nitrogen for 2 hrs. The resulting solution was cooled, diluted with ethyl acetate (100 ml.), and washed with water and then with saturated brine. The resulting organic solution was dried as above and distilled under reduced pressure. The residue was dried for 0.5 hr. at 100° (0.5 mm.) to give 0.209 g. of colorless glass, $\lambda_{max}$ 237.2 m$\mu$ (log E 4.00), $\lambda_{min}$ 212 m$\mu$ (log E 3.57). This material crystallized from ethyl acetate-petroleum ether (B.P. 68°) to give 0.150 g. (77.6% yield) of colorless rods, M.P. 155.0–165.0° with slight previous softening. Concentration of the mother liquors provided 0.006 mg., M.P. 153.0–166.0°. Recrystallization of the total crystalline product from ethyl acetate afforded 0.124 g. (64.2% overall yield) of the crude unsaturated keto diacetate-A (VIIA, R=CH$_3$CO) in two crops: 0.110 g. (first crop), M.P. 176.0–180.0°, and 0.014 g. (second corp), M.P. 170.0–176.0°. A 20 mg. sample of the first crop material was recrystallized twice from ethyl acetate and twice from acetone to provide 13 mg. of colorless plates M.P. 182.5–183.5°, $\lambda_{max}$ 237.7 m$\mu$ (log E 4.232);

$\lambda_{max.}^{CHCl_3}$ 5.69$\mu$ (m)($\gamma$-lactone C=O)

5.81 $\mu$ (s)(acetate C=O), 6.19 $\mu$ (w)(conjugated C=C), and 8.10 $\mu$ (s, br)(acetate C=O).

Analysis.—Calcd. for C$_{25}$H$_{34}$O$_7$: C, 67.24; H, 7.68. Found: C, 66.90; H, 7.70.

Recrystallization of the remaining 0.111 g. of crystalline product from ethyl acetate gave 0.102 g. (53.4% overall yield) of the unsaturated ketone VIIA, (R=CH$_3$CO), M.P. 179.0–181.0°.

(c) ISOMER-B (VIIB, R=CH$_3$CO)

The same procedure and reagents as described directly above were used.

To a solution of 0.259 g. (0.577 millimole) of keto diacetate-B (VIB, R=CH$_3$CO), M.P. 124.5–126.0°, prepared as described above, in 2.0 ml. of glacial acetic acid and 0.065 ml. of 0.14 N hydrobromic acid in acetic acid, was added 0.0960 g. (0.600 millimole) of bromine in 1.30 ml. of glacial acetic acid over a 5-min. period with stirring. The resulting pale orange solution was stirred for 5 min. at room temperature and then 0.2 g. of anhydrous sodium acetate was added. The resulting mixture was processed as described for isomer-A above to give 0.314 g. of crude crystalline bromo ketone, M.P. 156–168°.

The entire crude product was dried for 16 hrs. over calcium hydride in a vacuum desiccator and then treated with 0.073 g. (1.7 millimoles) of anhydrous lithium chloride in 2.8 ml. of dimethylformamide for 2 hrs. at 100° under nitrogen as described above. The product was isolated as above and dried for 1 hr. at 100° (0.5 mm.) to yield 0.279 g. of a tan glass, $\lambda_{max}$ 237 m$\mu$ (log E. 3.85). This material crystallized from ethyl acetate to give 0.167 g. of colorless prisms, M.P. 129–144°. Recrystallization of this material from i-propyl ether-ethyl acetate gave 0.130 g. of prisms, M.P. 144–164°, $\lambda_{max}$ 237 m$\mu$ (log E 3.89).

Since recrystallization had not accomplished the purification, the entire product was chromatographed on 14 g. of silica gel in a 1.3 by 15.5 cm. column. The fractions eluted with 19:1 to 1:1 benzene-ether provided 0.008 g. (31% recovery) of colorless prisms, $\lambda_{max}$ 236 m$\mu$ (log E. 3.60) which gave positive halogen (Beilstein) test. Continued elution with 1:1 benzene-ether through 4:1 ether-acetone provided 0.191 g. (69% recovery) of material which crystallized as needles or prisms and the ultraviolet spectra of which exhibited $\lambda_{max}$ 237–238 m$\mu$ (log E. 3.95–4.08). Recrystallization of this material from i-propyl ether-ethyl acetate gave 0.145 g. (52% yield; first crop) of a mixture of the two crystalline forms: prisms, M.P. 150.0–153.0°, $\lambda_{max}$ 238 m$\mu$, (log E 4.19) and needles, M.P. 83–92°, which resolidified at 105° on seeding with a sample of the prisms and finally melted at 147.0–151.0°. Thus the needle form was either a solvate or a polymorph of the prism form.

Concentration of the mother liquors provided 0.015 g. (second crop) of needles, M.P. 82.0–91.0°. A 50 mg. sample of the first crop material was recrystallized from ethyl acetate to give 18 mg. of unsaturated keto diacetate-B (VIIB, R=CH$_3$CO) as colorless prisms, M.P. 154.0–155.0°; $\lambda_{max}$237.9 m$\mu$ (log E 4.236).

Analysis.—Calcd. for C$_{25}$H$_{34}$O$_7$: C, 67.24; H, 7.68. Found: C, 66.91; H, 7.61.

The major bands in the infrared spectrum of the above sample were the same as those displayed by isomer-A.

*The 1$\beta$-(2-hydroxyethyl) - 2$\alpha$-(2 - hydroxypropyl)-4$\beta$-hydroxy - 4b$\beta$ - methyl - 7 - ethylenedioxyl-1,2,3,4,4a$\alpha$, 4b,5,6,7,8,10a$\beta$ - dodecahydrophenanthrene - 2$\beta$-carboxylic acid (2→4)-lactone diacetates*

(a) ISOMER-A (VIIIA, R=COCH$_3$)

A solution of 100 mg. (0.224 millimole) of the unsaturated keto diacetate-A (VIIA, R=CH$_3$CO), M.P. 179.0–181.0°, prepared as described above in Part a, and 30 mg. (0.158 millimole) of p-toluenesulfonic acid monohydrate in 20 ml. of 2-methyl-2-ethyl-1,3-dioxolane (freshly distilled from lithium aluminum hydride), B.P. 114° (730 mm.), was distilled slowly through a 4-in. Vigreaux column (under nitrogen) such that 8 ml. of the solution distilled in 2 hrs. The resulting pale yellow solution was cooled, 5 ml. of 10% potassium bicarbonate was added with swirling, and the resulting mixture was diluted with 50 ml. of benzene. The phases were separated, the bicarbonate solution was washed with benzene and the combined organic solution was washed with saturated brine and dried over anhydrous sodium sulfate. The solvent was removed under reduced pressure to give 133 mg. of pale yellow glass which crystallized from i-propyl ether-acetone to give 112 mg. of crystals, M.P. 128–135° with a small residue finally melting at 150°.

Since recrystallization did not purify the product, it was chromatographed on 5.5 g. of Florisil in a 1.3 by 8 cm. column. The initial fractions eluted with benzene through 10:1 benzene-ether yielded 17 mg. (13% recovery) of non-crystalline oily material and were foliwed by the elution, with 4:1 benzene-ether through 99:1 ether-absolute ethanol of 90.2 mg. (68% recovery, 82.1% yield) of colorless needles, M.P. 127–143°. Recrystallization of this material from i-propyl ether-ethyl acetate provided 67.8 mg. (61.6% yield) of colorless needles in two crops; 520 mg. (first crop), M.P. 152.0–153.0°, and 15.8 mg. (second crop), M.P. 150.0–152.5°. Two recrystallizations of a 10 mg. sample of the first crop material from i-propyl ether-acetone gave 6.1 mg. of VIIIA (R=CH₃CO) in the form of fine colorless needles, M.P. 154.5–156.0°

$\lambda_{max.}^{CHCl_3}$ 5.68μ (ms)(γ-lactone)

5.80 μ (s)(acetate C=O) and 8.08 μ (s, br)(acetate C–O).

*Analysis.*—Calcd. for $C_{27}H_{38}O_8$: C, 66.10; H, 7.81. Found: C, 65.97; 7.88.

Final elution of the above column with 49:1 ether-absolute ethanol through acetone gave 34.0 mg. (26% recovery) of a crystalline product which crystallized from ethyl acetate-petroleum ether to give 20.4 mg. (20.4% yield) of prisms, M.P. 166–176° undepressed on admixture with the starting material (VIIA, R=CH₃CO). Based on the recovered unsaturated ketone, the yield of the ketal diacetate-A was 77.5%.

(b) ISOMER-B (VIIIB, R=CH₃CO)

A solution of 112 mg. (0.251 millimole) of the isomer-B unsaturated ketone (VIIB, R=CH₃CO), M.P. 148.0–151.0°, prepared as described above and 0.030 g. of p-toluenesulfonic acid monohydrate in 20 ml. of the dioxolane (see above) was distilled under nitrogen at such a rate that 9 ml. of distillate was collected over a 4-hr. period. The resulting yellow solution was processed as described in Part *a* directly above to give 148 mg. of yellow crystals which, upon trituration with ether, yielded 117 mg. of needles, M.P. 130.0–159.0°, $\lambda_{max}$237 mμ log E 3.56). The observed extinction coefficient suggested that 30–40% of the starting material was still present.

Recrystallization of this material from i-propyl ether-ethyl acetate provided 69.0 mg. (56.1% yield) of almost colorless blades, M.P. 160.0–168.0°. A 20 mg. sample of this material was recrystallized four times from i-propyl ether-acetone to give 7.0 mg. of VIIIB (R=CH₃CO) in the form of colorless blades, M.P. 174.5–175.0°.

*Analysis.*—Calcd. for $C_{27}H_{38}O_8$: C, 66.10; H, 7.81. Found: C, 66.12; H, 7.94.

The infrared spectra of the isomeric ketal diacetates were essentially identical except for an 8.71 μ band in the spectrum of isomer-A which was not present in that of isomer-B.

*The 1β - (2 - hydroxyethyl) - 2α - (2 - hydroxypropyl)- 4β - hydroxy - 4bβ - methyl - 7 - ethylenedioxy-1,2,3,4,4aα,4b,5,6,7,8,10,10aβ - dodecahydrophenanthrene-2-carboxylic acid (2→4)-lactones*

(a) ISOMER-A (VIIIA, R=H)

A 62.0 mg. (0.126 millimole) sample of ketal diacetate-A (VIIA, R=CH₃CO), M.P. 151.0–153.0°, prepared as described above, was dissolved in 2.0 ml. of anhydrous methanol (distilled from potassium hydroxide) by warming on a steam bath. The resulting solution was cooled to room temperature and then 2.0 ml. of 10% methanolic potassium hydroxide was added with swirling. The resulting solution was left for 6 hrs. at 26°, cooled in an ice bath and water (5 ml.) was added until the solution was faintly cloudy. The mixture was diluted with 50 ml. of chloroform and washed with 15 ml. of saturated brine. The aqueous phase was washed several times with chloroform and then the combined organic solution was washed with 5 ml. of saturated brine, dried over anhydrous sodium sulfate was distilled under reduced pressure.

The glassy residue (53.0 mg.) crystallized from ethyl acetate and on trituration gave 40.1 mg. (77.7% yield) of VIIIA (R=H) in the form of colorless rods, M.P. 185.0–187.0°. The crystalline product was recrystallized four times from ethyl acetate and once from i-propyl ether-ethyl acetate. A 6 mg. sample of resulting colorless needles, M.P. 185.0–185.5°, was submitted for analysis.

*Analysis.*—Calcd. for $C_{23}H_{34}O_6$: C, 67.95; H, 8.43. Found: C, 67.81; H, 8.19.

(b) ISOMER-B (VIIIB, R=H)

A 54.5 mg. (0.111 millimole) sample of ketal diacetate-B (VIIIB, R=CH₃CO) which was prepared as described above was treated exactly as described for isomer-A in Part *a* above to give 34.1 mg. (75.5% yield) of a neutral solid, M.P. 196.0–199.5°, and 11.7 mg. (25.9% yield) of relactonized colorless solid, M.P. 205.0–208.0°. Recrystallization of the former material from ethyl acetate gave 18.0 mg. of a solid, M.P. 209.0–213.0° undepressed on admixture with the 205–208° material. Recrystallization of the combined product from ethyl acetate, from ethyl acetate-petroleum ether (B.P. 68°), from acetone-petroleum (B.P. 68°), from methylene dichloride-ether or from aqueous methanol containing a trace of pyridine afforded solid product which melted anywhere from 173 to 214°. Aqueous acetone containing a trace of pyridine was the only recrystallization medium from which the product obtained consistently melted above 200°. Therefore the total product was recrystallized five times from this medium to give 5.5 mg. of VIIIB (R=H) in the form of fine blades, M.P. 206.0–208.5°.

*Analysis.*—Calcd. for $C_{23}H_{34}O_6$: C, 67.95; H, 8.43. Found: C, 68.28; H, 8.65.

The remaining material was crystallized from the above solvent to give 23.8 mg. of solid, M.P. 205.0–208.0°.

*dl-3-ethylenedioxy-11β-hydroxy-17α-Δ⁵-pregene - 20-one-18-oic acid (11→18)-lactone (X) and the 17β-isomer (XI)*

(a) FROM KETAL DIOL-A (VIIIA, R=H)

To an ice cooled solution of 38.0 mg. (0.0935 millimole) of the ketal diol-A, M.P. 185.0–187.0°, prepared as described above, in 0.15 ml. of dry pyridine (distilled from calcium hydride) was added 23.0 mg. (0.117 millimole) of p-toluenesulfonyl chloride (distilled and recrystallized), and the resulting solution was left for 15 hrs. at 5°. Then the cold solution, which contained crystals of pyridine hydrochloride, was diluted with 2 ml. of chloroform and there was cautiously added 1.0 ml. of 10% potassium bicarbonate solution with stirring. The stirring was continued for 3 min. in an ice bath and then the mixture was diluted with chloroform and washed with bicarbonate solution, with water and finally with saturated brine. The organic solution was dried over anhydrous sodium sulfate and distilled (below 50°) under reduced (aspirator) pressure to give 62.2 mg. of a colorless glass which was dissolved in 0.4 ml. of dry pyridine (see above) and added, using two 0.1 ml. portions of pyridine to wash, to the cooled oxidizing reagent which had been prepared from 0.29 g. of chromium trioxide (dried over calcium hydride) and 2.9 ml. of dry pyridine. The resulting mixture was stirred for 15 min. and then left for 8 hrs. at 25°. The resulting mixture was then diluted with ethyl acetate and washed with water, with dilute bicarbonate solution and again with water. The combined aqueous solution was extracted thoroughly with ethyl acetate and these combined extracts were dried and distilled as above to give 61.3 mg. of the keto toxylate IX in the form of a semicrystalline glass, $\lambda_{max.}^{CHCl_3}$ 5.70μ (s)(γ-lactone C=O)

5.84 μ (m)(sat. ketone C=O), 6.25 μ (C=C) and 9.10 μ (s)(ketal C–O).

A solution of this product in 2.0 ml. of benzene was evaporated under reduced pressure to remove traces of the solvent. The residue was dried for 1 hr. at 26° (0.5 mm.) and then dissolved in 1.9 ml. of dry benzene (stored over sodium wire) and 1.9 ml. of dry t-butyl alcohol (distilled from calcium hydride). To the resulting solution there was added, with stirring under nitrogen, 0.30 ml. of a 0.48 N solution of potassium t-butoxide in dry t-butyl alcohol. (The reagent was prepared by dissolving 0.40 g. of potassium in 20.0 ml. of dry t-butyl alcohol under nitrogen.) A precipitate began separating within 1 min.

and, after 30 min., the solution was diluted with 10 ml. of water and extracted with ethyl acetate. The aqueous solution was cooled in an ice bath, acidified with 5% hydrochloric acid, diluted with 10 ml. of saturated brine and then extracted with ethyl acetate. The combined extracts were washed with saturated brine and dried as above.

The glassy residue (39.0 mg.) obtained on evaporation of the solution was chromatographed on 2.0 g. of silica gel in a 0.8 by 7 cm. Elution with 99:1 benzene-ether (all fractions 20 ml.) gave 1.8 mg. (5% recovery) of colorless needles. Elution with 9:1 ether-benzene gave 14.1 mg. (36% recovery) of material which crystallized from ethyl acetate-petroleum ether to give 6.4 mg. of needles, M.P. 138–140° with resolidification and final M.P. 172–176°. Another recrystallization from the same solvent provided 3.7 mg. of needles (10% yield), M.P. 192.0–194.0° with softening and resolidification at 134°. Continued elution with 9:1 through 1:1 benzene-ether afforded 18.5 mg. (48% recovery) of mixed crystals which melted in the range of 158–192°.

Since neither the melting points nor the elution provided criteria for separating the products from the above column, the total recovered material (35.0 mg.)—less the first 1.8 mg. fraction and the 3.7 mg. of recrystallized material—was rechromatographed on 1.5 g. of Florisil in a 0.8 by 8.8 cm. column. The fractions (all 10 ml.) eluted with 19:1 and 9:1 benzene-ether gave 13.0 mg. (43% recovery) of colorless needles, M.P. 149.0–156.0°. This material was recrystallized from ethyl acetate-petroleum ether (B.P. 68°) to give 7.0 mg. of fine needles, M.P. 197.5–200.0° with softening and resolidification at 134–137°. This product was combined with the 3.7 mg. sample described above and recrystallized from the above solvent to give 10.0 mg. of the 17α-pregnenone (X) in the form of needles, M.P. 134–139° with resolidification on scratching and final M.P. 195.0–199.0°;

$\lambda_{max.}^{CHCl_3}$ 5.68μ (s) (γ-lactone C=O)

5.85 μ (ms) (sat. ketone C=O). Concentration of the mother liquors provided 2.7 mg. of additional needles, M.P. 133.0–137.0°.

Continued elution with 9:1 and then 4:1 benzene-ether gave 6.6 mg. (21% recovery) of crystals, M.P. 147–162° (dec.), $\lambda_{max.}^{CHCl_3}$ 5.68μ (s) (γ-lactone C=O)

5.86 μ (m) (sat. ketone C=O) and 6.26 μ (vw) (aromatic C=C). Four recrystallizations of this product from ethyl acetate-petroleum ether (68°) gave less than 1 mg. of the 17β-pregnenone (XI), M.P. 211.0–215.0° (see below). Admixture with the 197.5–200.0° melting material above gave M.P. 164–185°. Final elution with 1:1 benzene-ether through acetone gave 11.7 mg. (38% recovery) of a semi-crystalline solid.

In order to remove the toxylate impurities, the total residue from the above column and the recrystallizations—less the 12.7 mg. of the 17α-acetyl ketal (X) and the small sample of XI—was dissolved in 2 ml. of 5% methanolic potassium hydroxide solution and left for 20 hr. at room temperature. The resulting yellow solution was processed as described above for the cyclization to give 23 mg. of yellow glass which was chromatographed on 1.1 g. of Florisil as above. The crude 17α-isomer (4.2 mg.) was eluted with 19:1 benzene-ether and on one recrystallization from ethyl acetate-petroleum ether (68°) gave 2.5 mg. of needles, M.P. 134.0–139.0°. Thus, the total overall yield of the 17α-isomer X from ketal diol-A (VIII, R=H) was 15.2 mg. or 42.0%.

An intermediate 2.1 mg. of amorphous solid was obtained on elution with 9:1 benzene-ether and then elution through ether provided 11.3 mg. of mixed crystals melting in the range of 148–200°. Two recrystallizations of this material from ethyl acetate-petroleum ether provided 4.3 mg. of large needles, M.P. 199.0–207.0°.

Admixture of this product with an authentic specimen of dl - 3 - ethylenedioxy - 11β - hydroxy - Δ⁵ - pregnene - 20-one-18-acid (11→18)-lactone (XI), M.P. 194.0–214.0° (Schmidlin et al., loc. cit.) gave M.P. 198.0–214.0°. The infrared spectrum of the above sample was essentially identical with that of the authentic sample. The overall yield of the 17β-acetyl ketal XI from the ketal diol-A was 11.9%.

(b) FROM KETAL DIOL-B (VIIIB, R=H)

A 161 mg. (0.396 millimole) sample of keto diol-B (VIIIB, R=H), M.P. 198.0–205.0°, prepared as described above, was treated with 83.0 mg. (0.435 millimole) of p-toluene-sulfonyl chloride, M.P. 166.0–67.0° (see above) in 0.55 ml. of dry pyridine (distilled from barium oxide) for 16 hrs. at 5°. Isolation as above gave a foam (0.232 g.) which was oxidized with 0.310 g. of chromium trioxide in 5.5 ml. of dry pyridine for 9 hrs. at 26°. The resulting colorless foam (0.216 g.) was dried for 10 hrs. at 26° (0.1 mm.), and then dissolved in 7.5 ml. of dry benzene and 7.5 ml. of dry t-butyl alcohol. There was then added, with stirring under nitrogen, 1.20 ml. of 0.51 N potassium t-butoxide (6.1 millimoles) in t-butyl alcohol. The resulting solution was left for 0.5 hr. at 26° and then processed as described in Part a above to give 0.157 g. of crude product which was chromatographed on 8.0 g. of Florisil in a 1.4 by 13 cm. column. The fractions eluted with 49:1 through 4:1 benzene-ether yielded 65.7 mg. (42% recovery) of ether-soluble, colorless needles, M.P. 129–175°, which were recrystallized from i-propyl ether-methylene dichloride to give 51.7 mg. (33.9% overall yield) of colorless fine needles in two crops: 46.7 mg. (first crop), M.P. 157–159° and 189.0–192.0°, and 5.0 mg. (second crop), M.P. 184.0–90.0° with softening and resolidification at 150°. Admixture of the first crop material with a 193.5–195.5° sample of the 17α-pregnenone (X) prepared from ketal diol-A (VIIIA, R=H) gave no melting point depression and the infrared spectra of the samples were identical.

Further elution with 4:1 and then 1:1 benzene-ether provided 27.9 mg. (18% recovery) of partly ether-soluble amorphous solid and then elution with ether through 19:1 ether-acetone gave 37.2 mg. (23% recovery) of an ether-insoluble semi-crystalline glass which was recrystallized four times from ethyl acetate-petroleum ether (68°) to give 1.1 mg. (0.7% yield) of colorless needles, M.P. 204.0–210.0° undepressed on admixture with the authentic sample of the 17β-pregnenone (XI). The infrared spectrum of this material was identical with that of the authentic sample.

*Epimerization of X to XI*

A solution of 10.0 mg. (0.0259 millimole) of the 17α-acetyl ketal X, M.P. 184–190° and 40.0 mg. of anhydrous potassium carbonate in 2.0 ml. of methanol and 0.3 ml. of water was refluxed for 3 hrs. under nitrogen. The resulting solution was then diluted with 5 ml. of water and concentrated to 4–5 ml. under reduced (aspirator) pressure. Chloroform (15 ml.) was added and the mixture was acidified to pH 2 with 5% hydrochloric acid with swirling in an ice bath and then washed successively with 10% potassium bicarbonate solution, with water and with saturated brine. The organic solution was dried over anhydrous sodium sulfate and evaporated.

The solid residue (10.1 mg.) was chromatographed on 0.5 g. of Florisil in a 0.5 by 5 cm. column. Elution with 19:1 through 4:1 ether-benzene gave 3.7 mg. of ether-soluble starting material, M.P. 125–131° and 153.0–157.5° with slight previous softening, and was followed by the elution, with 1:1 benzene-ether through ethyl acetate, of 6.0 mg. of ether-insoluble crystals, M.P. 192.0–198.0°. Recrystallization of the latter material from i-propyl ether-methylene chloride gave 4.0 mg. of colorless blades, M.P. 209.5–213.5° undepressed on admixture with the 194.0–214.0° melting authentic sample of XI.

dl-11β-hydroxy-Δ⁴-pregnene-3,20-dione-18-oic acid (11→18)-lactone

A solution of 2.5 mg. (6.5 micromoles) of the 17β-acetyl ketal (XI), M.P. 200.0–212.0°, prepared as described directly above, in 0.50 ml. of distilled acetone containing 0.90 mg. of p-toluenesulfonic acid monohydrate and 0.015 ml. of water was refluxed for 1 hr. under nitrogen. Water (1.0 ml.) was then added and the solution was evaporated under reduced pressure (aspirator) to remove the acetone. The resulting suspension yielded no crystalline material on cooling and therefore was diluted with 3 ml. of 5% potassium bicarbonate solution and washed with three 10-ml. portions of distilled methylene dichloride. The entire organic solution was washed with saturated brine, dried over anhydrous sodium sulfate and evaporated to give 2.6 mg. of semicrystalline residue. One recrystallization of this material from ethyl acetate-petroleum ether afforded 1.1 mg. (49% yield) of colorless blades, M.P. 215.0–218.5° undepressed on admixture with authentic dl-11β-hydroxy-Δ⁴-pregnene-3,20-dione-18-oic acid (11→18)-lactone, M.P. 211.5–217.0° (Schmidlin et al., loc. cit.). The spectrum of the above material and that of the authentic sample were identical.

dl-11β-Hydroxy-17α-Δ⁴-pregnene-3,20-dione-18-oic acid (11→18)-lactone

A 3.0 mg. (7.8 micromole) sample of the 17α-acetyl ketal (X), M.P. 134–139° and 195–199°, prepared as described above, was treated as described above for XI. The acetone was removed as above and the resulting suspension was allowed to stand overnight at 5° to give 2.2 mg. (82% recovery) of colorless needles, M.P. 209.0–214.0°. Recrystallization from ethyl acetate-petroleum ether (68°) provided 1.5 mg. (56% yield) of colorless rods, M.P. 224.5–228.0°

$\lambda_{max.}^{CHCl_3}$ 5.68µ (s)(γ-lactone C=O)

5.86 µ (ms)(sat. ketone C=O), 6.02 µ (s)(unsat. ketone C=O) and 6.19 µ (w)(conj. C=C). Schmidlin et al., loc. cit., reported M.P. 224–227°.

The (11→18)-lactol of dl-3-ethylenedioxy-17α-Δ⁵-pregnene-11β,20-diol-18-al (XII)

A 50.0 mg. (0.129-millimole) sample of the 17α-acetyl ketal (X) (35.0 mg., M.P. 193.5–195.5°, and 15.0 mg., M.P. 190.5–192.0°) in a 6 ml. round-bottomed flask, equipped with a side-arm and a glass-covered magnetic stirring bar, was dried in a desiccator for 3 hrs. at 26° (0.1 mm.) over calcium hydride. Then, while passing a slow stream of nitrogen through the system via the side-arm, there was added, with stirring, a solution of 10.4 mg. (0.26 millimole) of lithium aluminum hydride in 4.1 ml. of dry tetrahydrofuran (twice distilled from lithium aluminum hydride). The ketal dissolved immediately and the resulting solution was left for 2 hrs. at 26°. A solution of 2 drops of water in 1 ml. of tetrahydrofuran was then added dropwise with stirring, and the resulting suspension was filtered and the residue was washed with tetrahydrofuran and then methylene dichloride. Evaporation of the solvent under a stream of dry nitrogen provided 50.2 mg. of a solid, M.P. 180.0–192.0° with slight previous softening, which was recrystallized from ethyl acetate-petroleum ether (B.P. 68°) to give 41.1 mg. (81.6% yield) of the lactol ketal XII in the form of colorless prisms, M.P. 190.0–193.5°

$\lambda_{max.}^{CHCl_3}$ 2.88µ (ms)(hydroxyl O—H)

and 9.1 µ (s)(ketal C—O).

The (11→18)-lactol of dl-17α-Δ⁴-pregnene-11β,20-diol-3-one-18-al (XIII, R=H)

A solution of 40.0 mg. (0.102 millimole) of the hydroxy ketal (XII), M.P. 190.0–193.5°, described above, in 4.0 ml. of distilled acetone, containing 7.2 mg. of p-toluenesulfonic acid monohydrate and 0.12 ml. of water, was refluxed for 1 hr. under nitrogen. The resulting solution was diluted with 4.0 ml. of water, concentrated until cloudy, seeded and then allowed to stand for 1.5 hrs. at 5°. The supernatant liquid was drawn off and the crystals were washed with water and dried for 4 hrs. at 26° (0.02 mm.) to give 32.1 mg. (91% recovery) of colorless blades, M.P. 208–231°.

The remaining aqueous solution was extracted with ethyl acetate and the combined extracts were washed with dilute bicarbonate solution, with water and then with saturated brine. The organic solution was dried over anhydrous sodium sulfate and distilled under reduced (aspirator) pressure to yield 7.0 mg. of pale yellow crystals, M.P. 199–212° with softening from 180°. In order to test the homogeneity of the total product, it was fractionally crystallized from ethyl acetate without seeding. Thus there was obtained 16.6 mg. (first crop), of blades, M.P. 227.0–233.0°, and 16.0 mg. (second crop), M.P. 227.0–233.0° with slight softening from 223°. The yield of the unsaturated keto lactol XIII (R=H) was 32.6 mg. or 92.2%.

The (11→18)-lactol methyl ether of dl-17α-Δ⁴-pregnene-11β,20-diol-3-one-18-al (XIII, R=CH₃)

To a solution of 33.6 mg. (0.0970 millimole) of the unsaturated lactol XIII (R=H), prepared as described in the first run above, in 6.0 ml. of dry methanol (distilled from calcium hydride) was added a solution of 4.5 mg. (0.0224 millimole) of p-toluenesulfonic acid monohydrate in 0.50 ml. of dry methanol. The resulting solution was stirred with a glass-covered magnetic stirring bar for 5 min. under dry nitrogen and then allowed to stand for 26 hrs. at room temperature. Cold saturated potassium bicarbonate solution (1.0 ml.) was then added with rapid stirring followed by 2.0 ml. of water and the solution was concentrated almost to dryness under reduced (aspirator) pressure. The resulting mixture was diluted with chloroform and washed with water and then with saturated brine. The combined aqueous phase was washed with chloroform and then the entire organic solution was dried over anhydrous sodium sulfate. Distillation of the solution provided a colorless glass residue (35.2 mg.) which crystallized from i-propyl ether to give 28.1 mg. (79.5% yield) of lactol methyl ether XIII (R=CH₃) in the form of colorless prisms, M.P. 168.0–169.5° with sweating from 165.0°

$\lambda_{max.}^{CHCl_3}$ 2.89µ (w)(hydroxyl O—H)

6.02 µ (s)(unsat. ketone C=O) and 6.19 µ (m)(conj. C=C). The entire crude product from this experiment—less a 0.2 mg. sample of the crystals—was used as described directly below.

The (11→18)-lactol methyl ether of 17α-pregnen-11β-ol-3,20-dione-18-al (XIV, R=CH₃)

The oxidizing reagent was prepared by adding 34.0 mg. (0.340 millimole) of chromium trioxide (stored over calcium hydroxide) to 0.34 ml. of dry pyridine (distilled from barium oxide) with stirring. The resulting slurry was stirred for 15 min. and then there was added, with stirring, a solution of the 35.0 mg. sample of hydroxy methyl ether XIII (R=CH₃), described directly above in 0.20 ml. of dry pyridine, using two 0.06 ml. portions of pyridine as wash. The mixture was stirred for 15 min. and then allowed to stand overnight (16 hrs.) at room temperature. The resulting mixture was diluted with ethyl acetate (25 ml.) and washed with 5 ml. of water, with 5 ml. of dilute bicarbonate solution, and again with water. The combined aqueous extracts were washed with three 10 ml. portions of ethyl acetate which were each washed with 3 ml. of water, the aqueous wash being combined with the aqueous phase prior to the next ethyl acetate extraction. The combined organic extracts were then washed with saturated brine and dried over anhydrous sodium sulfate.

Distillation of the above organic solution under reduced pressure gave 34.5 mg. of a colorless glass which crystallized from i-propyl ether to yield 26.3 mg. of diketo lactol ether XIV (R=CH₃) in the form of colorless needles, M.P. 165.5–167.5° with softening from 164.5°

$\lambda_{max}^{CHCl_3}$ 5.86μ (ms)(sat. ketone C=O)

6.02 μ (s)(unsat. ketone C=O), 6.19 μ (w)(conj. C=C) and 8.95 μ (s)(lactol ether C—O).

*Epimerization of the 17α-lactol methyl ether XIV (R=CH₃)*

(a) IN BASIC MEDIUM

A 3.0 mg. (8.4 micromole) sample of the above lactol methyl ether XIV (R=CH₃), M.P. 165.5–167.5°, was dissolved in a 1.0 ml. aliquot of a solution which was prepared from 0.2 g. of anhydrous potassium carbonate, 1.5 ml. of water and 10 ml. of distilled methanol. The resulting solution was refluxed for 3 hrs. under nitrogen and then 3 ml. of water was added. The methanol was removed under reduced pressure (aspirator) and the resulting solution was diluted with 3 ml. of saturated brine and washed three times with 10 ml. portions of distilled chloroform. The entire organic solution was dried over anhydrous sodium sulfate and distilled under reduced pressure.

The residue (4.3 mg.) was chromatographed on 1.5 g. of Florisil in a 0.3 by 5.6 cm. column. Elution with 49:1 benzene-ether through 1:1 benzene-ether (3.0 ml. fractions) provided 1.6 mg. (53% yield) of needles, M.P. 163.0–167.0°, which, on one recrystallization from methylene dichloride-petroleum ether (B.P. 68°), gave 1.4 mg. of needles, M.P. 167.0–168.5°, undepressed on admixture with the starting material. Continued elution with ether through 49:1 ether-ethyl acetate gave 0.2 mg. (7% yield) of semi-crystalline material and then 19:1–4:1 ether-ethyl acetate afforded 0.7 mg. (20% yield) of crystalline material which was recrystallized from methylene dichloride-petroleum ether to give 0.3 mg. of 17β-Δ⁴-pregnen-11β-ol-3,20-dione-18-al (11→18)-lactol methyl ether, M.P. 159.0–166.5°, $\lambda_{max}^{CHCl_3}$ 5.85μ (ms)(sat. ketone C=O)

6.01 μ (s)(unsat. ketone C=O) and 6.19 μ (w)(conj. C=C). Admixture of this material and the 167.0–168.5° melting 17α-isomer melted at 136–154°.

*dl-17α-Δ⁴-pregnen-11β-ol-3,20-dione-18-al (11→18)-lactol (XIV, R=H)*

(a) FROM CRUDE LACTOL METHYL ETHER XIV (R=CH₃)

The 2.8 mg. (7.5 micromoles) of crude 17α-acetyl lactol ether XIV (R=CH₃), prepared as described above, was dissolved in 0.40 ml. of 70% aqueous acetic acid (by volume) and heated on a steam bath for 1.5 hrs. under nitrogen. The resulting solution was cooled, diluted with distilled chloroform and washed with dilute bicarbonate and then with saturated brine. The organic solution was dried over anhydrous sodium sulfate and distilled under reduced pressure.

The colorless solid residue (2.9 mg.) crystallized from ether to give 2.1 mg. (81% yield) of XIV (R=H) in the form of microcrystals, M.P. 197–202° with slight softening from 190°, $\lambda_{max}^{CHCl_3}$ 2.92μ (w)(hydroxy O—H)

5.86 μ (s)(sat. ketone C=O), and 6.02 μ (s)(unsat. ketone C=O) with no lactol ether band between 8.6 and 9.0 μ.

(b) DIRECTLY FROM THE UNSATURATED KETO LACTOL XIII (R=H)

The 2.8 mg. (8.1 micromoles) of XIII (R=H), M.P. 227.5–231.5°, prepared as described above, was dissolved in 0.6 ml. of dry methanol containing 0.60 mg. of p-toluene-sulfonic acid monohydrate and allowed to stand under nitrogen for 29 hrs. at room temperature. The resulting solution was processed as described in the larger run above to give 4.0 mg. of tan glass. This product was oxidized with 14 mg. of chromium trioxide in a total of 0.35 ml. of dry pyridine as described above to give 4.1 mg. of tan glass.

A solution of this product in 0.2 ml. of 70% aqueous acetic acid was heated under nitrogen for 1.3 hrs. at 100° and the product was isolated as described in Part a above to give 4.0 mg. of a tan glass. This material crystallized on standing and was triturated with ethyl acetate to give 0.8 mg. (about 30% overall yield) of XIV (R=H) in the form of colorless microcrystals, M.P. 200.5–208.0°, $\lambda_{max}^{CHCl_3}$ 2.91μ (w)

5.86 μ (m), 6.01 μ (s) and 6.19 μ (w).

*The (11→18)-lactol methyl ether of dl-21-acetoxy-17α-Δ⁴-pregnen-11β-ol-3,20-dione-18-al (XVII, R=CH₃, R'=CH₃CO)*

The lactol ether XIV (R=CH₃), was recrystallized from ether in a 2.5 ml. round-bottomed flask equipped with a side-arm, a ground-glass stopper, and a glass-covered magnetic stirring wire. The product was triturated with ether and dried overnight in a desiccator over a mixture of calcium hydride and anhydrous calcium sulfate to give 23.3 mg. (0.0650 millimole) of XIV (R=CH₃), M.P. 165.0–168.0°. A positive pressure nitrogen source was affixed to the side-arm of the flask and then, while passing a stream of nitrogen through the system, there was added, with stirring, a solution of 39.0 mg. (0.267 millimole) of freshly distilled diethyl oxylate, B.P. 87° (27 mm.), in 0.300 ml. (±0.002 ml.) of dry t-butyl alcohol (freshly distilled from calcium hydride). The resulting mixture was warmed to 70° (oil bath) with stirring until homogeneous (5 min.), cooled to 55° (5 min.) and then there was added, with continued stirring, 0.040 ml. of 4.6 N methanolic sodium methoxide. (The base was prepared from 1.9 g. of sodium in 20 ml. of dry methanol under nitrogen and standardized against potassium acid phthalate.)

A greenish-yellow paste developed within 10 sec. and was stirred for 20 sec. at 55° and then for 15 min. at room temperature. A solution of 11.0 mg. (0.184 millimole) of distilled glacial acetic acid in 0.5 ml. of dry methanol (distilled from calcium hydride) was then added to neutralize the salt, and this was followed, after 3 min., by the addition of 16.5 mg. (0.065 millimole) of iodine in 0.300 ml. of dry methanol. The color of the solution faded to pale brown within 20 min. after 2.5 hrs. there was added, with stirring, 130 mg. (1.57 millimoles) of freshly fused potassium acetate. The resulting light brown solution was left for 24 hrs. at room temperature (26°) and then transferred to 7 ml. of ice water using two 1.0 ml. portions of 95% ethanol to wash in the last traces. The finely divided yellow solid which resulted was separated by centrifugation, washed with three 1 ml. portions of water, and then dried for 5 hrs. at 26° (0.1 mm.) to give 24.0 mg. (72% yield) of crude glyoxylate XVI (R=H, R'=COCO₂Et) as a yellow powder which gave a positive enol test (2% alcoholic ferric chloride) and a negative Beilstein test for halogen.

The remaining aqueous solution was diluted with 5 ml. of saturated brine and extracted with chloroform. These combined extracts were washed with saturated brine, dried over anhydrous sodium sulfate and distilled under reduced pressure to give 7.5 mg. (23% yield) of XVI (R=H, R'=COCO₂Et) in the form of a yellow green glass which gave positive enol and negative halogen tests.

To a cooled (ice bath) solution of the above crystalline product (24.0 mg., 0.047 millimole) in 0.430 ml. of dry methanol containing 20.0 mg. (0.218 millimole) of freshly fused sodium acetate under nitrogen was slowly added, with stirring over a 5 min. period, a solution of 7.37 mg. (0.0460 millimole) of bromine in 0.100 ml. of dry methanol. A white precipitate deposited during the addition and the resulting suspension was stirred for an additional 3 min. period. A solution of 0.046 millimole of sodium methoxide in 0.050 ml. of dry methanol (0.92 N) was then added and the resulting pale yellow slurry was allowed to warm to room temperature for 1 hr. with stirring. Glacial acetic acid (0.035 ml.), and 14.0 mg. (0.214 gram atom) of zinc powder were then added and the mixture was stirred vigorously for 1 hr. at room temperature under nitrogen. The mixture was then diluted with 10 ml. of chloroform and washed with a solution of 5 ml. of saturated brine and 3 ml. of 10% potassium bicarbonate. The aqueous solution was washed twice with chloroform and then the total organic solution was washed with saturated brine, dried over anhydrous sodium sulfate and distilled.

The pale yellow solid residue (23.1 mg.) was chromatographed on 1.0 g. of Florisil in a 0.8 by 5.3 column. Elution with benzene (10 ml. fractions) gave 0.9 mg. (4% recovery) of a semi-crystalline solid which was not studied further.

Further elution with 99:1 through 19:1 benzene-ether gave 1.6 mg. of non-crystalline solid and then the fractions eluted with 9:1–4:1 benzene-ether provided 11.6 mg. (50% recovery) of crystals, the individual fractions of which melted from 95° to 156°. This material was recrystallized from i-propyl ether-ether to give 3.3 mg. (19% yield) of colorless needles in two crops: 2.7 mg. (first crop), M.P. 158.0–165.0° undepressed on admixture with the 21-desoxy starting material, and 0.6 mg. (second crop) M.P. 152.0–161.0°. The infrared spectrum of the first crop material was identical with that of the starting material.

The next fractions eluted with 1:1 benzene-ether through 19:1 ether-ethyl acetate provided 5.6 mg. (24% recovery) of colorless glass which crystallized from ether-petroleum ether (68°) after prolonged scratching. The individual fractions of this product melted from 94° to 127°. Final elution of the column with 9:1 ether-ethyl acetate through acetone gave 5.2 mg. (22% recovery) of amorphous solid.

Since only partial fractionation was achieved by the above chromatography, the material eluted with 9:1 benzene-ether through 9:1 ether-ethyl acetate—less the 3.3 mg. of starting material—was rechromatographed on 1.0 g. of Florisil in a 0.7 by 6 cm. column. Elution with benzene provided an additional 0.4 mg. of the crystalline by-product and then elution with 99:1 benzene-acetone gave 2.5 mg. of non-crystalline material. The fractions eluted with 49:1 benzene-acetone (4 fractions) gave 6.7 mg. of material which was recrystallized twice from i-propyl ether-ether to give 0.8 mg. more of the starting material, M.P. 158.0–165.0°. Continued elution of the column with 97:3 and 24:1 benzene-acetone gave 1.5 mg. of crystalline material which was combined with the residue from the above recrystallization and recrystallized twice from i-propyl ether, using seeds from the last fraction, to give 1.6 mg. of XVII (R=CH₃, R'=CH₃CO) in the form of prisms, M.P. 129.0–134.0°.

$\lambda_{max}^{CHCl_3}$ 5.74 μ (ms)(α-keto acetate C=O)

5.79 μ (ms)(α-acetoxy ketone C=O), 6.02 μ (s)(unsat. ketone C=O), 6.19 μ (w)(conj. C=C), 8.12 μ (s, br)(acetate C=O), and 8.94 μ (s)(lactol C=O).

The 7.5 mg. (0.015 millimole) of amorphous 2-glyoxylate adduct (XVI, R=H, R'=COCO₂Et), obtained as described above, was dissolved in 0.20 ml. of dry methanol containing 9.3 mg. of freshly fused sodium acetate and treated with 0.014 millimole of bromine in 0.030 ml. of methanol at 0°, and then with 0.014 millimole of sodium methoxide in 0.015 ml. of methanol precisely as described above. Glacial acetic acid (0.020 ml.) and zinc (10 mg.) were then added and the mixture was stirred vigorously for 1 hr. The resulting solution was processed as above to give 8.1 mg. of tan glass which was chromatographed on 0.40 g. of Florisil in a 0.5 by 4 cm. column.

Elution with benzene through 19:1 benzene-ether provided 1.7 mg. (21% recovery) of a colorless gummy material and then elution with 9:1 and 4:1 benzene-ether gave 3.5 mg. (43% recovery) of material which crystallized from ether-petroleum ether (68°) to give 2.9 mg. of XVII (R=CH₃, R'=CH₃CO) in the form of colorless prisms, M.P. 130.0–134.5°. The infrared spectrum of this material was identical to that of the 129.0–134.0° material described above.

*21-acetoxy-17α-Δ⁴-pregnen-11β-ol-3,20-dione-18-al (11→18)-lactol (dl-17α-aldosterone acetate)(XVII, R=H, R'=CH₃CO)*

A 2.8 mg. (6.7 micromole) sample of the acetoxy lactol ether XVII (R=CH₃, R'=CH₃CO) described above was dissolved in 0.40 ml. of 70% aqueous acetic acid and the solution warmed for 1 hr. at 70° under nitrogen. The resulting colorless solution was cooled, diluted with distilled chloroform and washed with saturated bicarbonate solution (5 ml.), with water and finally with saturated brine. The organic solution was dried over anhydrous sodium sulfate and evaporated under reduced pressure. The infrared spectrum of the amorphous residue (3.0 mg.) was essentially the same as that of the starting material. Therefore the total product was retreated for 1 hr. on a steam bath precisely as described above to give 3.0 mg. of colorless glassy product, which was chromatographed on 0.15 g. of Florisil in a 0.5 by 3.5 cm. column.

The fractions (3 ml.) eluted with 99:1 and 49:1 benzene-acetone provided 0.8 mg. (30% recovery) of material which crystallized from i-propyl ether-ether to give 0.30 mg. (10% recovery) of starting material, M.P. 130.5–133.0°. Further elution with 49:1 through 24:1 benzene-acetone gave 0.6 mg. (20% recovery) of non-crystalline product and then elution with 19:1 through 9:1 benzene-acetone provided 1.5 mg. (62% yield based on recovered crystalline starting material) of colorless microcrystals, M.P. 164.0–167.0°. (One fraction which crystallized as blades melted at 166.0–169.0° with softening at 131° and total resolidification at 148°.) Recrystallization of the above material from i-propyl ether-methylene chloride gave 1.3 mg. of XVII (R=H, R'=CH₃CO) in the form of microcrystals, M.P. 166.0–169.0°.

$\lambda_{max}^{CHCl_3}$ 2.89 μ (w)(hydroxyl O—H)

5.74 μ (ms)(α-keto-acetate C=O), 5.79 μ (ms)(α-acetoxy ketone C=O), 6.00 μ (s)(unsat. ketone C=O), 6.19 μ (w)(conj. C=C), and 8.10 μ (s, br)(acetate C—O).

*17α-Δ⁴-pregnene-11β,21-diol-3,20-dione-18-al (11→18)-lactol (dl-17α-aldosterone) (XVII, R=R'=H)*

To a 1.0 mg. (2.4 micromole) sample of 17α-aldosterone acetate (XVII, R=H, R'=CH₃CO) described above, M.P. 166.0–169.5°, in 0.32 ml. of distilled anhydrous methanol was added a solution of 2.6 mg. of anhydrous potassium bicarbonate in 0.090 ml. of methanol. The resulting solution was allowed to stand for 30 hrs. under nitrogen at room temperature and then diluted with 1.0 ml. of water and evaporated to about 1 ml. under reduced (aspirator) pressure at room temperature. Water (1 ml.) and saturated brine (1 ml.) were then added and the resulting mixture was washed three times with 10-ml. portions of distilled chloroform. The total chloroform solution was washed with saturated brine, dried over anhydrous sodium sulfate and evaporated under reduced pressure.

The residue (1.0 mg.) crystallized from ethyl acetate to give 0.4 mg. (about 60% yield) of XVII (R=R'=H) in the form of colorless blades, M.P. 182.0–182.4°, $\lambda_{max}^{CHCl_3}$ 2.90μ (w)(hydroxyl OH)

5.81μ (m)(α-hydroxy ketone C=O), 6.00μ (s)(conj. ketone C=O), and 6.19μ (w)(conj. C=C). (A crystal removed during the crystallization melted at 189.0–192.0°.)

The residues from the above potassium bicarbonate hydrolysis were subject to paper chromatography and dl-aldosterone (XVIII, R=R'=H), formed by epimerization of the side-chain at the 17-position, was identified.

*dl-Aldosterone (XVIII, R,R'=H)*

Treatment of dl-17α-aldosterone 21-acetate (XVII, R=H, R'=COCH₃) with aqueous methanolic potassium carbonate gave a mixture of dl-aldosterone (XVIII, R,R'=H) and the dl-17α-aldosterone (XVII, R,R'=H) which was separated by chromatography. The dl-aldosterone exhibited exactly one-half the salt retention activity of natural aldosterone when tested in mice. The $R_F$ value (paper chromatography flow ratio) of the synthetic material in two different solvent systems was the same as for the natural product. Also the infrared spectrum showed the identity of the synthetic material with aldosterone.

*dl-21-acetoxy-Δ⁴-17β-pregnen-11β-ol-3,20-dione-18-oic acid (11→18)-lactone (XXVII, R'=COCH₃)*

A solution of 2.8 mg. of dl-aldosterone-21-acetate (XVIII, R=H, R'=COCH₃) in 0.1 ml. of pyridine was added to the chromium trioxide-pyridine complex prepared from 10 mg. chromium trioxide and 0.1 ml. pyridine and washed in with two 0.1 ml. portions of pyridine. After stirring for ten minutes the suspension was allowed to stand at room temperature for 16 hours.

The dark reaction mixture was taken up in 20 ml. of ethyl acetate and washed with 5 ml. portions of water, saturated potassium bicarbonate solution, twice with water, and finally with saturated salt solution. Each wash was back-washed with two 20 ml. portions of ethyl acetate. The combined, colorless ethyl acetate solution was dried over sodium sulfate and concentrated in vacuo on the steam bath to give 3 mg. of light yellow oil which crystallized on trituration with acetone; short rods, M.P. 215–233°.

This material was chromatographed on 0.25 g. of Florisil collecting 3 ml. fractions. Material eluted with 5% acetone in benzene to 10% acetone in benzene weighed 2.2 mg. and crystallized on trituration with acetone. Recrystallization from acetone-isopropyl ether gave XXVII (R'=COCH₃) in the form of white plates, M.P. 232–236°. The infrared spectrum in methylene chloride solution exhibited bands at 5.66, 5.76, 5.81, 6.05, 6.20 and 8.12μ.

This material could also be prepared by the hydrolysis-isomerization and reacetylation of 17α-isomer (XXVIII, R'=COCH₃) (described below) according to the method used for the isomerization of 17α- to 17β-aldosterone (see above).

*(11→18)-lactone of methyl dl-Δ⁵-3-ethylene-dioxy-11β-hydroxy-20-oxo-17α-pregnene-18-oic acid-21-oxalate*

A solution of 10 mg. (0.026 millimole) of the (11→18)-lactone of dl-Δ⁵-3-ethylenedioxy-11β-hydroxy-17α-pregnene-18-oic acid (X) and 24 mg. (0.28 millimole) of dimethyl oxalate in 1.5 ml. of benzene in a nitrogen-filled system was concentrated to 0.5 ml. To the cooled solution under nitrogen was added 0.01 ml. of 4.5 N sodium methoxide in methanol (freshly prepared from 1.9 g. sodium in 20 ml. of dry methanol). A yellow color developed almost immediately. After 18 hrs. stirring at room temperature the yellow solution contained some suspended solid.

The reaction mixture was taken up in 20 ml. of chloroform and 4 ml. 1 M sodium dihydrogen phosphate, the layers separated and the aqueous layer was washed with two 5 ml. portions of chloroform. The combined chloroform extracts were washed with water and saturated salt solution. After drying over sodium sulfate and concentrating in vacuo below 50°, the residue was evacuated at 1 mm. for 2 hrs. to remove dimethyl oxalate. The product (14.5 mg.) was a light yellow solid (prisms), M.P. 131–136° with softening at 115°.

The infrared spectrum in methylene chloride solution exhibited bands at 5.70, 5.75, 6.15, 6.27, and 9.10μ. The carbonyl absorption at 5.87μ present in the starting material was present only as a faint shoulder.

*(11→18)-lactone of dl-Δ⁵-3-ethylenedioxy-11β-hydroxy-20-oxo-21-acetoxy-17α-pregnene-18-oic acid*

The glyoxalate (14.5 mg.) from the preceding preparation was dried by evacuation for 2 hrs. at room temperature and 0.1 mm. pressure. The system was filled with nitrogen and 0.3 ml. of dry t-butyl alcohol, 0.3 ml. of a solution of 87 mg. of freshly fused potassium acetate in 10 ml. of dry methanol (2.61 mg., 0.027 millimole) and 0.4 ml. of a solution of 160 mg. of iodine in 10 ml. of dry methanol (6.4 mg., 0.025 millimole) were added. After stirring the mixture under nitrogen for 3½ hrs. at room temperature, the deep iodine color had faded to a pale orange. The color became light yellow upon addition of 50 mg. (0.5 millimole) of freshly fused potassium acetate. The resulting solution was allowed to stand in a desiccator at room temperature for 24 hrs., an addition 20 mg. of freshly fused potassium acetate added, and the light yellow solution let stand for an additional 24 hours. The solution was then pipetted into 5 ml. of saturated salt solution and 5 g. of ice in a separatory funnel. This was extracted three times with chloroform and the combined extracts washed with water and saturated salt solution, dried over sodium sulfate, and concentrated in vacuo on the steam bath. The resulting yellow oil (13 mg.) in methylene chloride had absorption at 5.70, 5.80, 8.10, and 9.10μ.

The total crude material was chromatographed on 0.65 g. Florisil and 5 ml. fractions were collected. Benzene to 10% ether in benzene eluted 2 mg. of non-crystalline material which was not further investigated. Ten percent ether in benzene followed by four fractions of 5% ethyl acetate in benzene eluted material which crystallized in fine needles when moistened with ether, M.P. 176–179°.

*dl-21-acetoxy-Δ⁴-17α-pregnen-11β-ol-3,20-dione-18-oic acid (11→18)-lactone (XXVIII, R'=COCH₃)*

The crystalline ketal, M.P. 176–179° (1.8 mg.) was heated at 100° in 1 ml. of 70% aqueous acetic acid in a nitrogen atmosphere. The crystals dissolved within a few minutes to give a faintly cloudy, light yellow solution. After 30 minutes, the solution was cooled, transferred to 5 ml. of ice cold saturated potassium bicarbonate solution and extracted three times with ether. The combined extracts were washed with water and saturated salt solution, dried over sodium sulfate, and concentrated to dryness in vacuo on the steam bath to give 3.5 mg. of gummy product. Chromatography on Florisil gave XXVIII (R'=COCH₃), M.P. 178–180° after triturating with cold acetone.

16-pregnen-11β-ol-3,20-dione-18-oic acid (11→18)-lactone (XXIII)

(a) FROM TRIOL-A (VA, R=H)

The oxidizing reagent was prepared by dissolving 56.0 mg. (0.555 millimole) of chromic anhydride (stored over calcium hydride) in 3.0 ml. of precooled anhydrous pyridine (distilled from calcium hydride) with stirring (glass-covered magnetic bar) for 5 min. in an ice bath. To the resulting cool orange slurry was added a solution of 30.0 mg. (0.0820 millimole) of triol-A (VA, R=H), M.P. 172.0–174.0°, prepared as described above, in 0.3 ml. of pyridine using two 0.2 ml. portions of pyridine as wash. The resulting mixture was stirred for 15 min. and then allowed to stand for 5 hrs. at room temperatures. The resulting brown mass was transferred to 20 ml. of ethyl acetate and extracted with 5 ml. of water. The aqueous phase was washed several times with ethyl acetate and then the combined organic extracts were washed with water, with 5% sodium bicarbonate solution and again with water. The combined aqueous extracts were washed with ethyl acetate and then the total organic solution was washed with saturated brine and dried over anhydrous sodium sulfate. The residue obtained on distilling the solvent (below 30°) was dried for 2 hrs. (0.3 mm.) at room temperature to give 35 mg. of diketo aldehyde XXII (R=H) as a colorless viscous liquid.

The entire neutral product (XXII, R=H) above was dissolved in 4.0 ml. of glacial acetic acid (distilled from potassium permanganate) and 0.80 g. (0.001 mole) of freshly fused sodium acetate was added. The flask was then flushed with nitrogen, stoppered and heated for 13 hrs. on a steam bath. (The mixture was initially swirled until homogeneous and the stopper was loosened occasionally to relieve the pressure.) The resulting light brown solution was cooled, diluted with 20 ml. of water, and extracted with ethyl acetate. The combined organic extracts were washed with water and then with saturated brine, dried as above and evaporated to give 25.0 mg. of pale yellow semi-crystalline oil, $\lambda_{max}$ 235 m$\mu$ (log E 3.52). This material was chromatographed on 1.25 g. of acid-washed alumina. Elution with 99:1 benzene-ether through 49:1 ether-ethyl acetate game 3 mg. (about 10% yield) of oily material while the fractions (all 7.5 ml.) eluted with 19:1 ether-ethyl acetate through ethyl acetate provided 14 mg. (50% yield) of a solid which, after two recrystallizations from ethyl acetate, afforded 8.0 mg. (29% overall yield from triol-A) of XXIII in the form of colorless leaflets, M.P. 247–251°; $\lambda_{max}$ 236.6 m$\mu$ (log E 3.88);

$$\lambda_{max.}^{CHCl_3} 5.68\mu \ (s) \ (\gamma\text{-lactone C=O})$$

5.85$\mu$ (s) (sat. ketone C=O), 6.01$\mu$ (s) (unsat. ketone C=O), and 6.25 $\mu$ (w) (conj. C=C).

The combined 237 m$\mu$ products from this experiment and several of those given below were rechromatographed on Florisil and recrystallized 4 times from ethyl acetate to give 5 mg. of XXIII in the form of colorless hexagonal plates, M.P. 256.0–258.5°, $\lambda_{max}$ 236.6 m$\mu$ (log E 3.904).

*Analysis.*—Calcd. for $C_{21}H_{26}O_4$: C, 73.65; H, 7.65. Found: C, 73.95; H, 8.00.

17β-pregnan-11β-ol-3,20-dione-18-oic acid (11→18)-lactone (XXI). Directly from the mixture of diketones IVA and IVB (R=CH₃CO, R'=CH₃).

The following transformation was conducted with partial purification of only one intermediate, the unsaturated ketone XXIII.

A 98.4 mg. (0.200 millimole) sample of the crude triacetate isomer mixture (V=CH₃CO), prepared in quantitative yield from the mixture of IVA and IVB (R=CH₃CO, R'=CH₃)

as described above, was dissolved in 2.4 ml. of 1 N solution of potassium hydroxide in methanol (distilled from calcium hydride) and left for 6 hrs. at room temperature. The solution was then acidified to pH 3 with 5% hydrochloric acid, diluted with 25 ml. of water and extracted 6 times with ethyl acetate. The combined organic extracts were extracted with 5% sodium bicarbonate solution, with water and then with saturated brine. The resulting solution was dried over anhydrous sodium sulfate and distilled under reduced pressure to give 64.5 mg. (88.1% yield) of a crude mixture of the triols V (R=H).

As a test of the aldehyde versus the tosylate approach to the 17β-prenane-3,20-dione XXI, one half of the above crude triol mixture (V, R=H) was used in each approach.

(a) ALDEHYDE APPROACH

To a solution of 32.2 mg. (about 0.17 millimole) of the above crude triol mixture (V, R=H) in 1.2 ml. of distilled acetone, 0.4 ml. of distilled t-butyl alcohol, and 0.2 ml. of water was added, with swirling, 54 mg. (0.40 millimole) of N-bromoacetamide, M.P. 107–108°. The resulting solution was allowed to stand for 15 hrs. at 5–10° and then a solution of 0.20 g. of sodium sulfite in 5 ml. of water was added. The resulting solution was extracted 4 times with ethyl acetate and these combined extracts were washed with 5% sodium bicarbonate solution, with water and then with saturated brine. The solution was dried as above and distilled under reduced pressure to give 31.2 mg. of tan glass.

This entire product was dissolved in 0.18 ml. of anhydrous pyridine (distilled from barium oxide) and added to an ice cooled slurry of the oxidizing reagent, prepared from 31 mg. of chromic anhydride and 0.31 ml. of pyridine, using two 0.5 ml. portions of pyridine as wash. The mixture was stirred for 15 min., allowed to stand at room temperature for 4.75 hrs., and then diluted with 30 ml. of ethyl acetate and washed with 10 ml. of water. The aqueous solution was extracted 4 times with ethyl acetate and the combined organic solution was washed with 5% sodium bicarbonate solution, with water and then with saturated brine. (All of the extractions were performed under nitrogen.) The resulting colorless organic solution was dried as above and distilled (below 30°) under reduced pressure to give 24.2 mg. (75.1% yield from crude triol) of crude diketo aldehyde (XXII, R=H).

This material was dissolved in 5.0 ml. of glacial acetic acid (distilled from potassium permanganate), 1.0 g. of freshly fused potassium acetate was added and the resulting mixture was heated on a steam bath for 12 hrs. under nitrogen. (The glass stopper of the flask was loosened occasionally at first to relieve the pressure and the mixture was initially swirled until the acetate had dissolved.) The resulting solution was cooled, diluted with ethyl acetate and washed with dilute bicarbonate solution, with water and then with saturated brine. The organic solution was dried as above and evaporated to give 23.6 mg. of XXIII as a light brown glass, $\lambda_{max}$ 234 m$\mu$ (log E 3.51).

Chromatography of the total product on 1.2 g. of Florisil in a 0.6 by 6 cm. column yielded, on elution with 49:1 through 10:1 ether-absolute ethanol, 9.3 mg. of a crystalline product, M.P. 180–234°, $\lambda_{max}$ 234 m$\mu$ (log E 3.63). Recrystallization of this material from ethyl acetate-petroleum ether (B.P. 68°) provided 5.0 mg. of XXIII in the form of colorless crystals, M.P. 236–255°.

The recombined 9.3 mg. of crude product was dissolved in 2.0 ml. of 95% ethanol (distilled from Raney nickel) and treated with hydrogen (atmospheric pressure) in the presence of 15 mg. of 6% palladium-on-strontium carbonate catalyst for 1 hr. with stirring. Essentially no hydrogen was absorbed, so the solution was filtered, evaporated to dryness and the residue was dissolved in 2 ml. of ethyl acetate, filtered through 0.1 g. of Florisil and again treated under the hydrogenation conditions. This time the hydrogen uptake was rapid and essentially ceased after 15 min. After 1 hr. the solution was centrifuged to remove the catalyst and then evaporated to give 9.0 mg. of colorless, semi-crystalline glass the ultraviolet spectrum of which exhibited no absorption at 230–240 m$\mu$.

Recrystallization of the product from ethyl acetate provided 4.0 mg. of crystals in two crops: 3.1 mg. (first crop), M.P. 204.0–211.0°, and 0.9 mg. (second crop), M.P. 198.0–210.0°. The first crop material was recrystalized from the same solvent to give 1.0 mg. of XXI in the form of colorless rods, M.P. 213.5–218.0°, undepressed on admixture with the 216.0–218.5° material prepared from the diketo tosylate XIX as described below.

The pregnanedione XXI prepared above and that prepared by the tosylate approach below were combined, filtered through a short column of Florisil in ethyl acetate and recrystallized 4 times from ethyl acetate to give a sample of XXI, M.P. 221.0–223.5°, as colorless coarse needles.

(b) TOSYLATE APPROACH dl - 1$\beta$-(2 - p-toluenesulfonoxyethyl) - 2$\alpha$ - (2-oxopropyl) - 4$\beta$ - hydroxy - 4b$\beta$ - methyl - 7 - oxoperhydrophenanthrene - 2$\beta$ - carboxylic acid (2→4) - lactone (XIX).

(1) *From triotol-A (VA, R=H) via the NBA reaction.*—A 73.2 mg. (0.200 millimole) sample of triol-A (V, R=H), was treated with 108 mg. (0.800 millimole) of N-bromoacetamide in 2.4 ml. of acetone, 0.8 ml. of t-butyl alcohol, and 0.4 ml. of water for 5 hrs. at 0–5°. The resulting 70.5 mg. (96.7% yield) of crude neutral product was dissolved in 0.28 ml. of anhydrous pyridine (distilled from barium oxide) and 4.00 mg. (0.204 millimole) of p-toluenesulfonyl chloride (distilled and recrystallized), M.P. 66.0–67.0°, was added with stirring. The mixture was stirred until the acid chloride had dissolved (1 min.) and then was allowed to stand for 15 hrs. at 5–10°. To the resulting solution, which contained large crystals of pyridine hydrochloride, was cautiously added 1.5 ml. of 5% sodium bicarbonate solution with stirring. The mixture was stirred for 5 min. and then diluted with ethyl acetate and washed with dilute bicarbonate solution, with water and finally with saturated brine. The organic solution was dried over anhydrous sodium sulfate and distilled (below 30°) under reduced pressure. The residue was dried at room temperature (1.0 mm.) for 3 hrs. to give 104.5 mg. of crude monotosylate.

$\lambda_{max}^{CHCl_3}$ 2.92$\mu$ (w)(hydroxyl-OH)

5.69$\mu$ (s) ($\gamma$-lactone (C=O), and 8.54$\mu$ (s) (sulfonate S=O).

The oxidation reagent was prepared by dissolving 160 mg. of chromic anhydride (stored over phosphorous pentoxide) in 1.6 ml. of precooled anhydrous pyridine (distilled from barium oxide) with stirring (magnetic bar). To the resulting orange slurry was added a solution of the total crude hydroxy tosylate above in 0.70 ml. of anhydrous pyridine using two 0.3 ml. portions of pyridine as wash. The resulting mixture was stirred for 0.5 hr., allowed to stand for 8.5 hrs. at room temperature, and then diluted with 50 ml. of ethyl acetate and 20 ml. of water. The phases were separated and the aqueous solution was washed with sodium bicarbonate solution, with water and then with saturated brine. The organic solution was dried as above and distilled under reduced pressure to give 100.0 mg. of a partly crystalline glass. A sparingly soluble impurity made recrystallization difficult and therefore the entire product was chromatographed on 5.0 g. of Florisil in a 0.9 by 7 cm. column.

The fractions (all 50 ml.) eluted with 99:1 benzene-ether through 19:1 ether-acetone yielded 6.1 mg. (5.8% yield) of an amorphous solid and were followed by the elution, with 9:1 ether-acetone, of 59.8 mg. (58.1% yield) of colorless prisms in two combined fractions: 25.6 mg. (first crop), M.P. 157.0–161.0° (dec.) and 32.2 mg. (second crop), M.P. 153–160° (dec.). The first crop material was used in the cyclization experiment described later in this section. The second crop material was recrystallized twice from chloroform-isopropyl ether and then 3 times from ethyl acetate to give XIX in the form of colorless prisms, M.P. 175.5–177.0° (dec.), $\lambda_{max}^{CHCl_3}$ 5.68$\mu$ (s)($\gamma$-lactone C=O)

5.84$\mu$ (s) (sat. ketone C=O), 6.25$\mu$ (m) (aromatic C=O), 6.66$\mu$ (w) (substituted phenyl), and 8.54$\mu$ (s) (sulfonate S=O).

*Analysis.*—Calcd. for $C_{28}H_{36}O_7S$: C, 65.09; H, 7.02. Found: C, 65.39; H, 7.06.

(2) *From triol-A (VA, R=H) without NBA treatment.*—To a precooled (ice bath) solution of 20.0 mg. (0.0550 millimole) of triol-A (V, R=H), M.P., 171.0–174.5°, prepared as described above, in 0.2 ml. of anhydrous pyridine (distilled from calcium hydride) and 0.4 ml. of dry, purified dioxane was added 0.20 ml. of anhydrous pyridine containing 12.0 mg. (0.0612 millimole) of p-toluenesulfonyl chloride (distilled and recrystallized) M.P. 66.0–67.0°. The resulting solution was stirred for 0.5 hr. and then allowed to stand for 12 hrs. at 0–5°. The resulting colorless solution, which contained no crystalline salt, was processed as described in Part a above to give 31 mg. of a colorless glass. This crude product was oxidized as described in Part a above using 61 mg. of chromic anhydride and 1.2 ml. of anhydrous pyridine for 11 hrs. at room temperature. The resulting viscous liquid (26 mg.), which contained some pyridine, was chromatographed on 1.3 g. of Florisil in a 0.8 by 8 cm. column. The fractions eluted with 49:1 through 1:1 benzene-ether gave 4.1 mg. of a semicrystalline material. No material was eluted from the column with ether to 10:1 ether-ethyl acetate. Further elution through ethyl acetate afforded 15 mg. (53% yield) of crystals, M.P. mainly 130–155° (dec.) with previous softening from 110°. The infrared spectrum of this product was essentially identical with that of the diketo tosylate XIX described above.

(3) *From triol-B (VB, R=H) via the NBA reactions.*—A 10.0 mg. (0.0273 millimole) sample of triol-B (VB, R=H), M.P. 182.0–183.5° prepared as described above, was treated with 15.0 mg. (0.110 millimole) of N-bromoacetamide, M.P. 107–108°, in 0.33 ml. of acetone, 0.10 ml. of t-butyl alcohol and 0.05 ml. of water for 5 hrs. at 0–5°. The resulting crude product (10.5 mg.), M.P. 121.0–138.0°, was dissolved in 0.20 ml. of anhydrous dioxane and 0.10 ml. of anhydrous pyridine and, after cooling to 0–5°, there was added 6.0 mg. (0.032 millimole) of p-toluenesulfonyl chloride, M.P. 66–67°, in 0.10 ml. of anhydrous pyridine. The resulting solution was allowed to stand for 16 hrs. at 0–5° and then treated precisely as described in Part 2 above. The resulting crude product (13.2 mg., 93.2% of theory) was treated with 24.0 mg. (0.240 millimole) of chromic anhydride in 0.44 ml. of anhydrous pyridine for 9 hrs. as described in Part 1 above.

The oily product (12.0 mg., 86.0% yield) was chromatographed on 0.6 g. of Florisil in a 0.4 by 4 cm. column (all 5 ml. fractions). Initial elution with benzene gave 1.1 mg. of partly crystalline oil. Less than 1 mg. of material was eluted with 99:1 benzene-ether through 99:1 ether-ethyl acetate, and then elution with 49:1 to 10:1 ether-ethyl acetate provided 4.7 mg. (34% yield) of a crystalline product, which, on recrystallization from ethyl acetate, provided 0.9 mg. of microcrystals, M.P. 288.0–301.0° with darkening from 150°. The residue from the mother liquors was crystallized from chloroform isopropyl ether in the presence of a seed from one of the middle fractions. Trituration with ethyl acetate provided 1.8 mg. (13% yield) of colorless prisms, M.P. 156.0–158.0° (dec.) undepressed on admixture with a sample of the diketo tosylate XIX, M.P. 158.0–161.0°, prepared from triol-A as described in Part 1 above. Continued elution with 10:1 ether-ethyl acetate gave 0.7 mg. of non-crystalline material and was followed by the elution of 1.2 mg. of partly crystalline solid which was not investigated. The recovery from this column was about 70%.

*17 α-pregnan-11 β-ol-3,20-dione-18-oic acid (11→18)-lactone (XX)*

(a) FROM THE DIKETO TOSYLATE XIX

The reagent was prepared by dissolving about 0.40 g. (10 milligram atoms) of potassium in 20 ml. of dry t-butyl alcohol (distilled from calcium hydride) under nitrogen (2 hrs. under reflux). A 1.00 ml. aliquot of the resulting solution was standardized against potassium acid phthalate and found to be 0.48 N.

A 0.13 ml. aliquot of the basic solution (containing 0.061 millimole of base) was then added, with stirring, to a solution of 21.0 mg. (0.0406 millimole) of the diketo tosylate XIX, M.P. 157.0–161.0°, prepared as described above, in 0.80 ml. of dry t-butyl alcohol under nitrogen at room temperature. Precipitation of a fine solid began immediately and, after the suspension had stirred for 25 min. at room temperature, it was diluted with 2 ml. of water and 20 ml. of ethyl acetate and washed with 5 ml. of water. The aqueous solution was washed with 20 ml. of ethyl acetate and then the combined organic solutions were washed with dilute bicarbonate solution with water and finally with saturated brine. The organic solution was dried over anhydrous sodium sulfate and distilled under reduced pressure to give 10.3 mg. (73.7% of theory) of a semi-crystalline product.

The remaining combined aqueous solution was acidified to pH 3 with concentrated hydrochloric acid and extracted with ethyl acetate. These combined extracts were washed with dilute bicarbonate, with water and then with saturated brine. The resulting solution was dried as above and distilled under reduced pressure to give 4.4 mg. (31.4% of theory) of a partly crystalline solid which was combined with the above 10.3 mg. of product and chromatographed on 0.8 g. of Florisil in a 0.7 by 5 cm. column. The fractions (all 5 ml.) eluted with 5:1 benzene-ether through 99:1 ether-absolute ethanol yielded 7.8 mg. (56% yield) of stout colorless needles, M.P. 181.0–186.0°, $$\lambda_{max.}^{CHCl_3}\ 5.71\mu\ (s)$$

5.86 μ (s) (see above) and only faint 6.28 μ phenyl absorption. Recrystallization of this product for ethyl acetate-isopropyl ether provided 6.5 mg. (46% yield) of colorless needles in two crops: 4.4 mg. (first crop), M.P. 187.0–188.0°, and 2.1 mg. (second crop), M.P. 184.0–188.0°. This product was combined with analogous material obtained from the cyclization experiments described below and rechromatographed on Florisil. Five recrystallizations of the product from isopropyl ether-ethyl acetate provided the analytical sample of the 17α-pregnanedione XX as fine colorless needles, M.P. 186.0–188.0°.

*Analysis.*—Calcd. for $C_{21}H_{28}O_4$: C, 73.22; H, 8.19. Found: C, 72.87; H, 8.13.

Continued elution of the above column with 19:1 and 10:1 ether-absolute ethanol gave 0.5 mg. (4% yield) of non-crystalline material. Final elution with 5:1 ether-absolute ethanol through absolute ethanol provided 3.6 mg. (26% yield) of a solid, M.P. 202–217° (dec.) with softening from 192°. Two recrystallizations of this material from ethyl acetate gave 0.6 mg. of colorless short rods, M.P. 216.0–218.5°, undepressed on admixture with the 213.5–218.0° sample of the 17β-pregnanedione XXI prepared from the 16(17)-pregnenedione XXIII (see above).

(b) FROM THE CRYSTALLINE MIXTURE OF TRIOLS (V, R=H) WITHOUT INTERMEDIATE PURIFICATION

A 50.0 mg. (0.136 millimole) sample of the crystalline mixture of triols (V, R=H), M.P. 141.0–156.0°, prepared as described above, was treated with 30.0 mg. (0.157 millimole) of p-toluenesulfonyl chloride, M.P. 66.0–67.0°, in 0.20 ml. of anhydrous pyridine (distilled from barium oxide) for 17 hrs. at 0–5°. The resulting crude mixture of dihydroxy tosylates was dried to constant weight (78.2 mg.) at room temperature (1.0 mm.) and then dissolved in 0.25 ml. of anhydrous pyridine and added, using 0.50 ml. of pyridine to wash, to a cooled slurry of the reagent prepared from 150 mg. (7.50 millimole) of chromium trioxide and 1.5 ml. of anhydrous pyridine. The resulting mixture was stirred for 15 min., left for 10 hrs. at room temperature and then processed as described above to give 76.0 mg. (95.4% yield) of crude diketo tosylate XIX as a viscous liquid. Benzene (20 ml.) was then added and distilled under reduced pressure to remove the last traces of pyridine and water. The resulting residue was dissolved in 2.5 ml. of t-butyl alcohol (distilled from calcium hydride) and 2.5 ml. of benzene under nitrogen and there was added, with stirring, 0.44 ml. of an approximately 0.50 N solution of potassium t-butoxide in dry t-butyl alcohol, prepared as described in part (a) directly above. The resulting cloudy solution was stirred for a few minutes at room temperature and then allowed to stand for a total reaction time of 30 min. The resulting suspension was acidified to pH 2 with 5% hydrochloric acid solution diluted with ethyl acetate and washed with saturated brine. The aqueous extract was washed with ethyl acetate and then the combined organic solution was dried over anhydrous sodium sulfate and distilled under reduced pressure.

The oily residue (53.5 mg., 114% of theory) was chromatographed directly on 2.5 g. of Florisil in a 0.8 by 9 cm. column taking 20 ml. fractions. Following the elution of an initial 8.3 mg. (14.8% recovery) of glassy solid, there was obtained, on elution with 5:1 benzene-ether, 19.1 mg. (34% recovery) of a crystalline product which on trituration with ether provided 12.0 mg. of colorless needles, M.P. 161.0–167.0°. Recrystallization of this material from ether provided 9.1 mg. (19.5% yield) of crude 17α-pregnanedione XX, M.P. 171.0–178.0° undepressed on admixture with an authentic sample.

Continued elution with 5:1 benzene-ether through 19:1 ether-ethyl acetate and then with 5:1 ether-ethyl acetate gave 12.3 mg. of another crystalline product. Trituration of this material with ether-ethyl acetate (1:1) afforded 8.2 mg. of mixed crystals, M.P. 179.0–194.0° (dec.), which were crystallized from etheyl acetate to give 3.8 mg. (8.1% yield) of colorless rods, M.P. 207.0–209.5° (dec.) undepressed on admixture with an authentic sample of XXI.

Epimerization of the 17α-pregnanedione XX was accomplished by treating a 4.4 mg. sample of XX, M.P. 187.0–188.0°, obtained as described directly above, in 1.0 ml. of 5% aqueous-methanolic (1:1) sodium hydroxide solution for 40 hrs. at room temperature. The resulting solution was acidified to pH 3–4 with 5% hydrochloric acid, stirred for 15 min. at room temperature and then diluted with water. The resulting mixture was extracted with ethyl acetate and then these combined extracts were washed with saturated brine and dried over anhydrous sodium sulfate. Evaporation of the solvent gave 4.1 mg. of material which crystallized from ethyl acetate to yield 1.8 mg. of colorless rods, M.P. 203.0–214.0°. Recrystallization of this material from the same solvent gave 0.8 mg., M.P. 212.0–217.5°, undepressed on admixture with a 216.0–218.5° melting sample of the 17β isomer (XXI). A mixture of this material and the starting material melted at 158.0–172.0°.

FLOW SHEETS
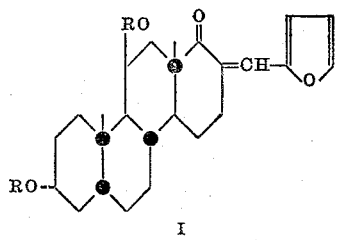
I
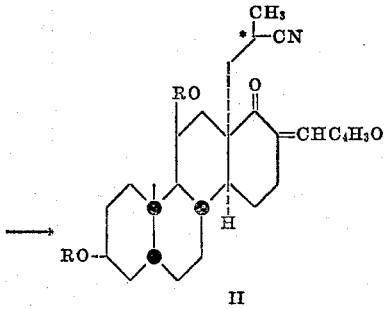
II
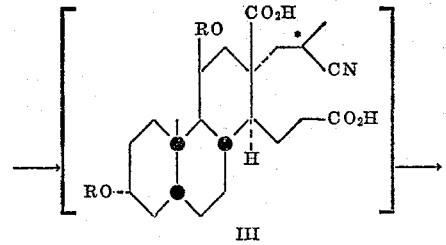
III
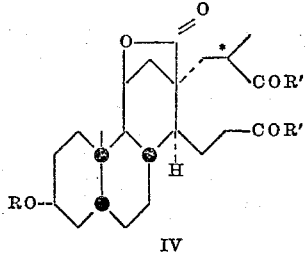
IV
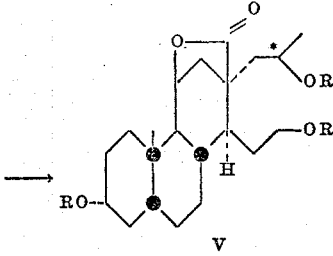
V
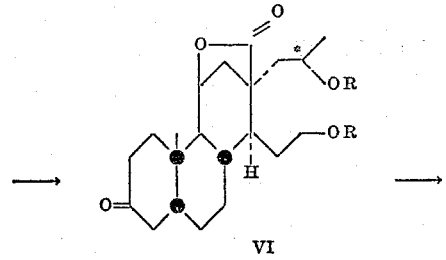
VI
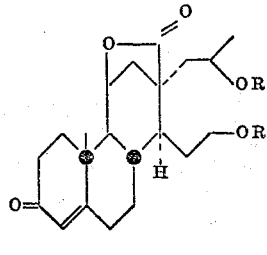
VII
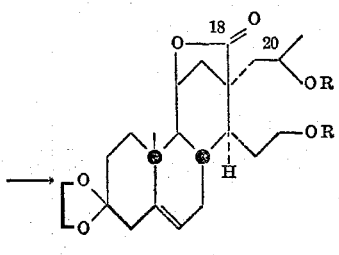
VIII
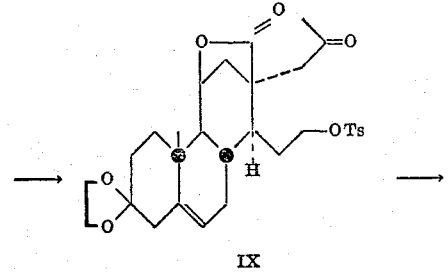
IX
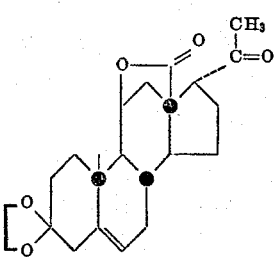
X
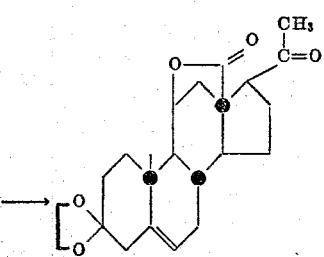
XI
X →
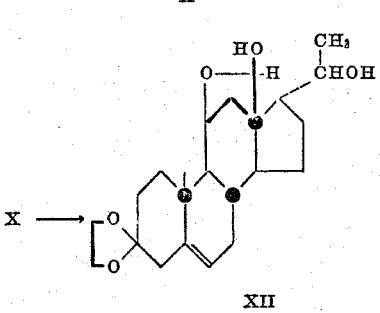
XII
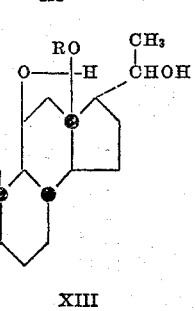
XIII
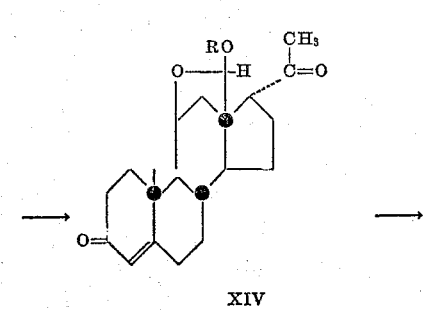
XIV
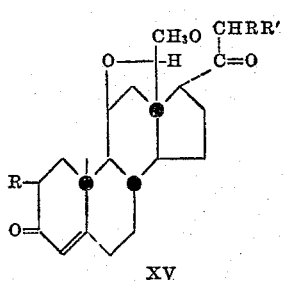
XV
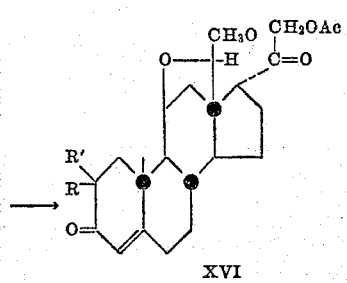
XVI
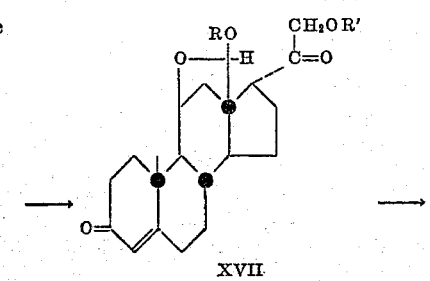
XVII

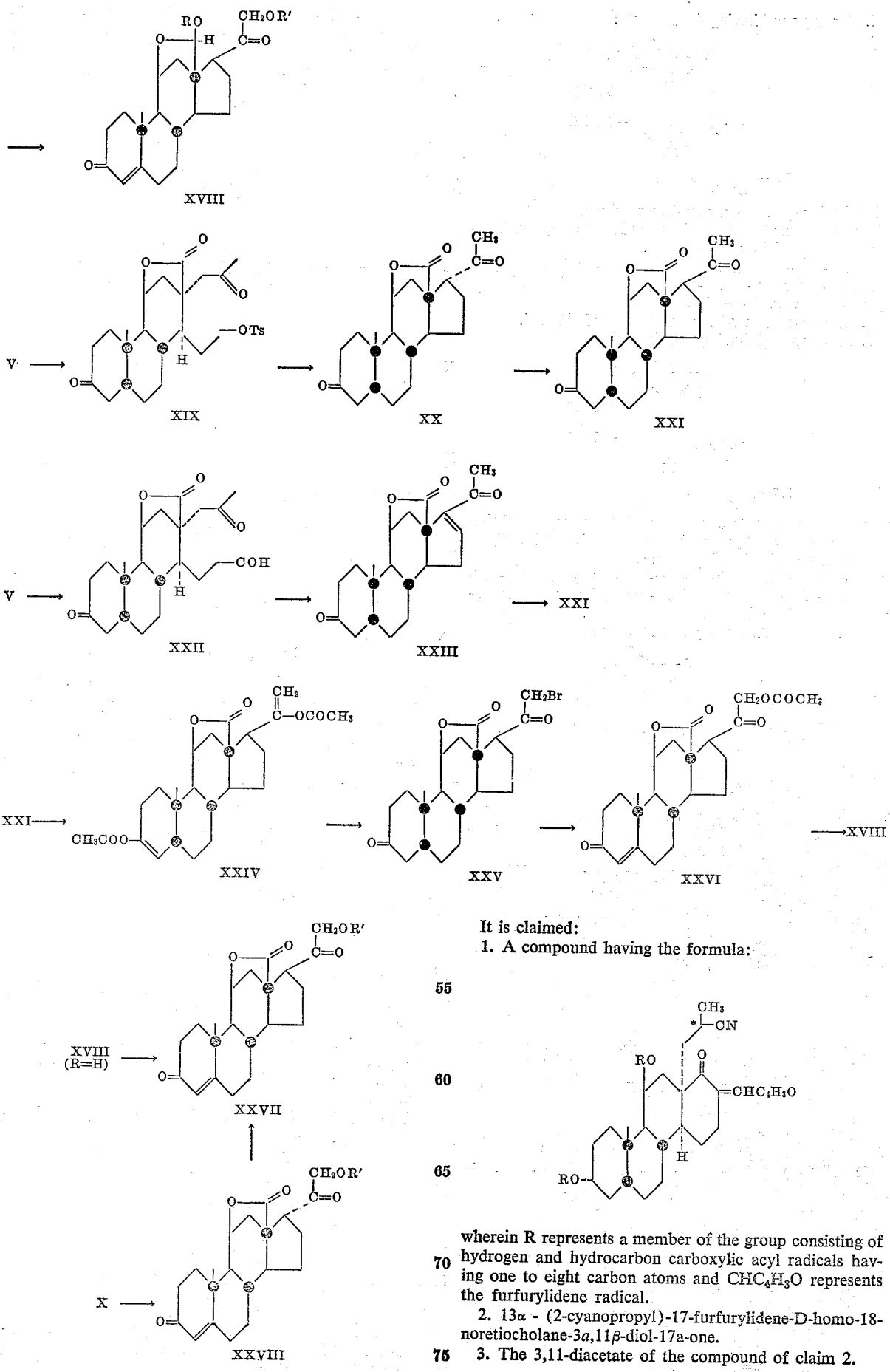
It is claimed:
1. A compound having the formula:
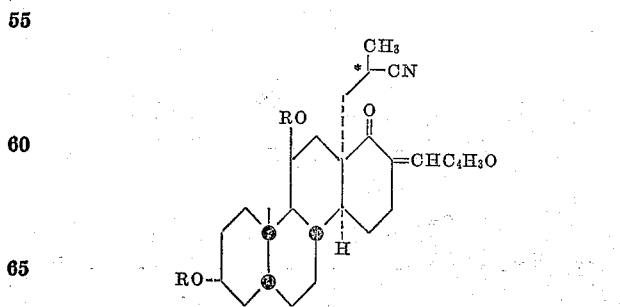
wherein R represents a member of the group consisting of hydrogen and hydrocarbon carboxylic acyl radicals having one to eight carbon atoms and $CHC_4H_3O$ represents the furfurylidene radical.
2. 13α - (2-cyanopropyl)-17-furfurylidene-D-homo-18-noretiocholane-3a,11β-diol-17a-one.
3. The 3,11-diacetate of the compound of claim 2.

4. A compound having the formula:

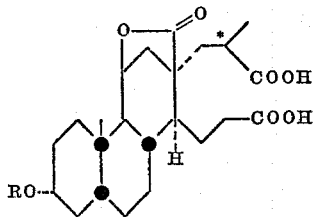

wherein R represents a member of the group consisting of hydrogen and hydrocarbon carboxylic acyl radicals having one to eight carbon atoms.

5. 1β - (2 - carboxyethyl) - 2α - (2 - carboxypropyl)- 4β,7α - dihydroxy - 4bβ - methylperhydrophenanthrene- 2β-carboxylic acid (2→4)-lactone.

6. The 7α-acetate of the compound of claim 5.

7. A compound having the formula:

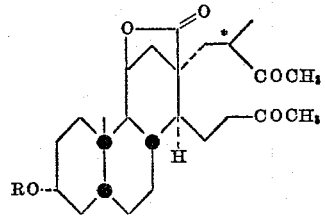

wherein R represents a member of the group consisting of hydrogen and hydrocarbon carboxylic acyl radicals having one to eight carbon atoms.

8. 1β - (2 - acetylethyl) - 2α - (2 - acetylpropyl) - 4β- hydroxy - 7α - acetoxy - 4bβ - methylperhydrophenan- threne-2β-carboxylic acid (2→4)-lactone.

9. A compound having the formula:

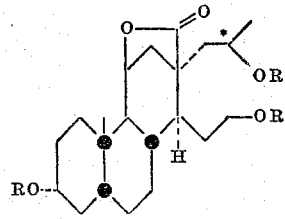

wherein R represents a member of the group consisting of hydrogen and hydrocarbon carboxylic acyl radicals having one to eight carbon atoms.

10. 1β - (2 - hydroxyethyl) - 2α - (2 - hydroxypropyl)- 4β,7α - dihydroxy - 4bβ - methylperhydrophenanthrene- 2β-carboxylic acid (2→4)-lactone.

11. The triacetate of the compound of claim 10.

12. 16-pregnen-11β-ol-3,20-dione-18-oic acid (11→18)- lactone having the formula:

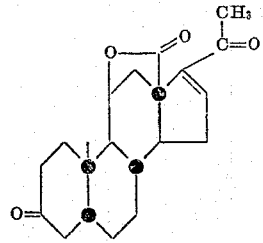

13. 17β - pregnan - 11β - ol - 3,20 - dione - 18 - oic acid (11→18)-lactone having the formula:

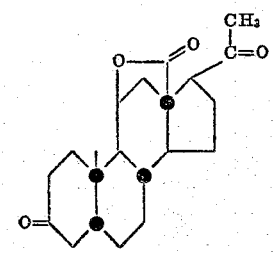

14. 1β - (2 - p - toluenesulfonyloxyethyl) - 2α - (2- oxopropyl) - 4β - hydroxy - 4bβ - methyl - 7 - oxoper- hydrophenanthrene-2β-carboxylic acid (2→4)-lactone having the formula:

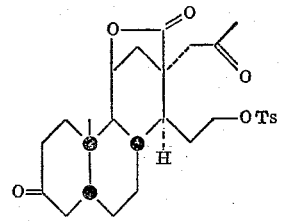

15. 17α - pregnan - 11β - ol - 3,20 - dione - 18 - oic acid (11→18)-lactone having the formula:

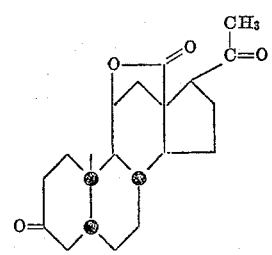

16. A compound having the formula:

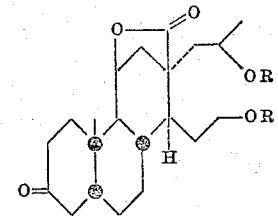

wherein R represents a member of the group consisting of hydrogen and hydrocarbon carboxylic acyl radicals having one to eight carbon atoms.

17. 1β - (2 - acetoxyethyl) - 2α - (2 - acetoxypropyl)- 4β - hydroxy - 4bβ - methyl - 7 - oxoperhydrophenan- threne-2β-carboxylic acid (2→4)-lactone.

18. A compound having the formula:

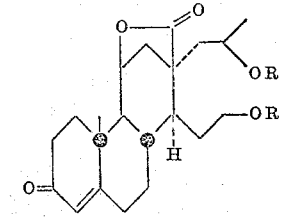

wherein R represents a member of the group consisting of hydrogen and hydrocarbon carboxylic acyl radicals having one to eight carbon atoms.

19. 1β-(2-acetoxyethyl) - 2α - (2-acetoxypropyl) - 4β - hydroxy - 4bβ - methyl - 7 - oxo-1,2,3,4,4aα,4b,5,6,7,9,10, 10aβ - dodecahydrophenanthrene - 2β - carboxylic acid (2→4)-lactone.

20. A 7-cyclic ketal derivative of a compound having the formula:

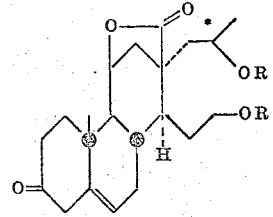

wherein R represents a member of the group consisting of hydrogen and hydrocarbon carboxylic acyl radicals having one to eight carbon atoms.

21. 1β - (2-Hydroxyethyl) - 2α - (2-hydroxypropyl)-4β - hydroxy - 4bβ - methyl - 7 - ethylenedioxy - 1,2,3,4,4aα,4b,5,6,7,8,10aβ - dodecahydrophenanthrene - 2β - carboxylic acid (2→4)-lactone.

22. The diacetate of the compound of claim 21.

23. A 3-cyclic ketal derivative of a compound having the formula:

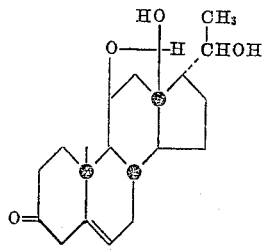

24. 3 - Ethylenedioxy - 17α - Δ⁵ - pregnen - 11β, 20-diol-18-al (11→18)-lactol.

25. 3 - Ethylenedioxy-17β-Δ⁵-pregnen-11β,20-diol-18-al (11→18)-lactol.

26. A compound having the formula:

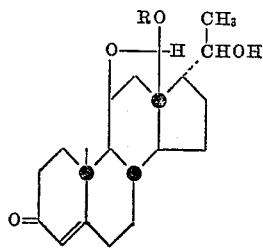

wherein R represents a member of the group consisting of hydrogen and lower-alkyl radicals.

27. 17α - Δ⁴ - Pregnene - 11β,20 - diol - 3 - one - 18 - al (11→18)-lactol.

28. The lactol methyl ether of the compound of claim 27.

29. The process for the preparation of the triacetate of 1β-(2-hydroxyethyl-2α-(2-hydroxypropyl)-4β, 7α-dihydroxy-4bβ - methylperhydrophenanthrene - 2β - carboxylic acid (2→4)-lactone which comprises reacting 1β-(2-acetylethyl) - 2α - (2 - acetylpropyl)-4β-hydroxy-7α-acetoxy - 4bβ - methylperhydrophenanthrene - 2β - carboxylic acid (2→4)-lactone with trifluoroperacetic acid.

30. The process for the preparation of a 3-cyclic ketal of 5 - pregnen - 11β - ol - 20 - one - 18 - oic acid (11→18)-lactone which comprises reacting a 7-cyclic ketal of 1β - (2-hydroxyethyl) - 2α - (2-hydroxypropyl)-4β - hydroxy - 4bβ - methyl - 7 - oxo - 1,2,3,4,4aα,4b,5,6,7,8,10aβ - dodecahydrophenanthrene - 2β - oic acid (2→4)-lactone successively with p-toluenesulfonyl chloride, chromic oxide in pyridine, and an alkali metal lower-alkoxide.

31. The process for the preparation of 17α - Δ⁴ - pregnene - 11β,20 - diol - 3 - one - 18 - al (11→18)-lactol which comprises reacting a 3-cyclic ketal of 17α-Δ⁵ - pregnen - 11β - ol - 20 - one - 18 - oic acid (11→18)-lactone with lithium aluminum hydride and hydrolyzing the resulting cyclic ketal under acidic conditions.

32. The process for the preparation of 17α-Δ⁴-pregnene-11β,20-diol-3-one-18-al (11→18)-lactol lower-alkyl ether which comprises reacting 17α-Δ⁴-pregnene-11β,20-diol-3-one-18-al (11→18)-lactol with a lower-alkanol in the presence of a strong acid.

33. The process for the preparation of 17α-Δ⁴-pregnen-11β-ol-3,20-dione-18-al (11→18)-lactol lower-alkyl ether which comprises reacting 17α-Δ⁴-pregnene-11β,20-diol-3-one-18-al (11→18)-lactol lower-alkyl ether with dipyridinium chromate in pyridine.

34. The process for preparing a 21-acyloxy-Δ⁴-pregnen-11β-ol-3,20-dione-18-oic acid (11→18)-lactone which comprises reacting a 21-acyloxy-Δ⁴-pregnen-11β-ol-3,20-dione-18-al (11→18)-lactol with chromic oxide in pyridine.

References Cited in the file of this patent
UNITED STATES PATENTS

| | | |
|---|---|---|
| 2,844,513 | Wettstein et al. | July 22, 1958 |
| 2,852,529 | Poos | Sept. 16, 1958 |
| 2,862,925 | Reichstein et al. | Dec. 2, 1958 |

OTHER REFERENCES

Schmidlin et al.: Experientia, vol. XI, Fasc. IX, pages 365–368 (1955).

Simpson et al.: Helv. Chim. Acta., vol. XXXVII, Fasc. IV, pages 1163–1200 (1954).

Wieland et al.: Helv. Chim. Acta., vol. XLI, Fasc. VI, page 1657 (1958).